US007353697B2

(12) United States Patent
Akkerman et al.

(10) Patent No.: US 7,353,697 B2
(45) Date of Patent: Apr. 8, 2008

(54) SYSTEM FOR MOUNTING AN ENGINE TO A FRAME

(76) Inventors: Neil H. Akkerman, 3230 Del Monte, Houston, TX (US) 77019; Daniel O. Dewey, 15106 Beacham Dr., Houston, TX (US) 77070

( * ) Notice: Subject to any disclaimer, the term of this patent is extended or adjusted under 35 U.S.C. 154(b) by 285 days.

(21) Appl. No.: 10/822,117

(22) Filed: Apr. 9, 2004

(65) Prior Publication Data
US 2005/0223786 A1 Oct. 13, 2005

(51) Int. Cl.
*G01L 3/00* (2006.01)
(52) U.S. Cl. ............... 73/117.3; 73/116; 73/117.2; 73/118.1; 73/862.29
(58) Field of Classification Search ............ 73/116, 73/117.2, 117.3, 118.1, 862.29
See application file for complete search history.

(56) References Cited

U.S. PATENT DOCUMENTS

| 2,389,361 A | 11/1945 | Hagg |
| 2,426,089 A | 8/1947 | Fitzgerald |
| 2,953,336 A * | 9/1960 | Etchells ............... 248/605 |
| 3,164,986 A * | 1/1965 | Krueger ............... 73/862.29 |
| 3,201,982 A | 8/1965 | Kennedy |
| 3,686,941 A | 8/1972 | Kramasz |
| 3,718,304 A * | 2/1973 | Schulz et al. ........... 248/548 |
| 3,731,896 A * | 5/1973 | Fehlberg ............... 267/140.3 |
| 3,903,738 A * | 9/1975 | Malchow ............... 73/862.29 |
| 3,939,702 A | 2/1976 | Paul |
| 3,978,718 A | 9/1976 | Schorsch |
| 4,313,341 A | 2/1982 | Yamaguchi |
| 4,691,288 A | 9/1987 | Kay |

OTHER PUBLICATIONS

Charles Fayette Taylor, The Internal Combustion Engine in Theory and Practice, 1999, pp. 292-294, vol. 2, M.I.T. Press, USA.

* cited by examiner

*Primary Examiner*—Edward Lefkowitz
*Assistant Examiner*—Freddie Kirkland, III
(74) *Attorney, Agent, or Firm*—Locke Lord Bissell & Liddell LLP

(57) ABSTRACT

A system for mounting an engine to a frame in a manner to permit measurement of its torque by a transducer which is isolated from loads induced by installation misalignments, frame deflections and acceleration induced forces. One embodiment of the system is compatible with widely used automotive resilient elastic engine mounts without engine or frame modifications.

32 Claims, 40 Drawing Sheets

SYSTEM FOR MOUNTING AN ENGINE TO A FRAME

FIELD OF THE INVENTION

This invention relates to an improved system for mounting an engine to a frame in a manner to measure torque while accommodating frame misalignment and flexure due to working loads. More particularly, it relates to such a system which is insensitive to most movement-induced acceleration forces. In this context, the engine is a rigid assembly including the motor and/or transmission and/or differential gear box that generates the driving torque so as, for example, to move a vehicle.

BACKGROUND OF THE INVENTION

It is common to mount a reciprocating engine with resilient mounting assemblies to isolate the frame from engine vibration. Another not often mentioned benefit of resilient mounting is the accommodation of manufacturing tolerances when mating two relatively rigid assemblies such as an engine and automobile frame. Furthermore, resilient mounting accommodates flexure of the frame caused by the engine working torque and vehicle dynamics. Vehicle dynamics includes stresses and strains caused by movement over uneven road surfaces, acceleration forces to increase velocity, braking forces to slow the vehicle, and forces generated when going around corners.

E. B. Etchells in U.S. Pat. No. 2,953,336 teaches the common three point resilient mounting of an engine transmission assembly into an automobile frame. This patent includes discussion of the nodal positioning of the engine mounts to minimize vibrations while controlling engine torque and accommodating road induced vibrations. This system incorporates a single resilient mounting at the rear of the engine assembly and a pair of transversely spaced resilient mounts at the front of the engine. The nodal point is a place of minimum vibration. Positioning of the front engine mounts as close as is practical to the percussion points of the engine assembly reduces road induced loads on the rear mount and allows the rear mount to be soft and compliant.

The mounting system of Etchells is widely utilized and there exist improvement patents such as Fehlberg, U.S. Pat. No. 3,731,896, that demonstrates continued applicability. Fehlberg teaches the need for mechanical limits to retain the engine transmission assembly to the frame when the strength limits of resilient elastic elements are exceeded.

R. E. Krueger, in U.S. Pat. No. 3,146,986, discusses the need for torque measurement in automobiles, boats and small airplanes. The embodiment shown includes hydraulic sensing means for measuring torque, and is mounted parallel to a resilient elastic engine mount in an automobile.

The engine in an automobile is heavy, generates significant torque and must be firmly attached to the frame to resist road dynamics. These considerations require that the resilient elastic mount be of sufficient stiffness to prohibit excessive engine movements. Mounting a sensor in parallel to the resilient mount induces measurement error caused by frame deflection, thermal expansion or contraction of the elastic element and temperature induced elastic stiffness changes. The zero adjusting unit provided in the Krueger apparatus can only be effective if all conditions are static after adjustment and during the time measurements are taken. Repeatability and accuracy are affected when measurements are taken in parallel to the engine retention components of the engine mount.

G. L. Malchow, in U.S. Pat. No. 3,903,738, discloses a torque-sensing device that replaces one of the engine mounts in an engine installation as depicted in Etchells. Malchow removes one of the resilient mounts and replaces it with a strain gage-equipped pivotal yoke assembly. In this configuration, the engine is restrained from rotational movement by a force couple applied on one side by the elastic engine mount and on the other side by the strain gage-equipped pivotal yoke assembly. The configuration of the yoke assembly of the strain gage equipped engine mount makes determination of the length of moment arm and the magnitude of restraining force a complex geometrical problem. Malchow avoids these issues by calibrating the apparatus "where weights were suspended from a torque arm which was connected to the transmission out put shaft."

The stability of the complex geometry that determines torque arm length affects calibration and repeatability of the torque measurement. The location of the restraining force through the resilient elastic mount is subject to movement-induced creep or sag. Resilient elastic supports undergo creep and sag over time due to thermal and long term loading. Also, frame flexure due to road induced loads can cause lateral displacements between the frame mounting points of the front engine mounts, changing the inclination of the yoke, and significantly altering the calibration of torque measurement.

The yoke assembly does not restrain the engine from movement due to acceleration loads caused by braking or acceleration. These loads are restrained by the resilient engine mount on the side opposite the yoke assembly and the compliant mount on the transmission. Aside from potential safety issues, the resilient engine mounts will allow movement that may result in damage to the yoke assembly and/or inaccurate torque measurement.

A three point mounting system, with a sensor at one of the mounting points, has an effective pivotal axis through the other two mounting points. The center of gravity of the engine mass is significantly displaced both vertically and laterally from the pivotal axis of the engine, thereby departing from the teachings of Etchells regarding the importance of nodal positioning of the mounts.

Even when vehicle velocity and engine torque are constant, the lateral or sideways displacement of the center of gravity with respect to the pivotal axis allows vertical accelerations of the vehicle, such as those caused by movement while traveling over bumps in the road, to create forces that result in false torque measurements.

Similarly, even when vehicle velocity and engine torque are constant, vertical displacement of the center of gravity from the pivotal axis allows cornering accelerations caused by the vehicle going around turns to create forces that result in false torque measurements.

Also, even if engine torque is constant, combined vertical and lateral displacement of the center of gravity from the pivotal axis along with an inclined pivotal axis allows longitudinal accelerations resulting in vehicle velocity changes to create forces that result in false torque measurements.

SUMMARY OF THE INVENTION

Accordingly, it is a principal object of the present invention to provide an improved system for mounting an engine to a frame in a manner to measure engine torque while isolating the measurement from loads induced by installation misalignments and frame deflections as well as acceleration induced forces.

Another object is to provide a mounting system which is compatible with previously installed resilient engine mounts, without engine or frame modifications.

A further object is to provide such a system wherein torque is sensed by a transducer which has the ability to sense torque in only one or in both directions.

These and other objects are accomplished in accordance with illustrated embodiments of the invention wherein the system includes: first and second bearings, each connectable to the frame and engine to form a pivotal axis about which the engine is free to rotate relative to the frame, wherein, in accordance with the objects of the invention, the pivotal axis passes near the center of gravity of the engine and is aligned other than orthogonally to the axis of the engine output shaft. More particularly, the system also includes a load sensing transducer which includes parts connectable to the frame and the engine for resisting and measuring rotational forces between the engine and the frame about the pivotal axis.

In one embodiment of the invention, the first and second bearings are connectable to portions of the frame and engine and are in axial alignment to receive shaft portions on the pivotal axis displaced from one another about the engine.

In other embodiments, one of the bearings comprises bearing segments, with each segment having a first part guidably moveable with respect to a second part, forming an instantaneous pivotal center on the pivotal axis. The other bearing preferably comprises a compliant engine mount. For reasons which will be apparent from the description to follow, the pivotal axis extends through or near the center of gravity of the engine.

BRIEF DESCRIPTION OF THE DRAWINGS

These and other objects of the present invention are accomplished as described in the following description and drawings in which:

FIG. 1(d) is an enlarged detail view of a portion of FIG. 1, as shown thereupon.

FIG. 6(a) is a cross-sectional view of the bearing segment shown in FIG. 6, as seen along the line 6(a)-6(a) of FIG. 6.

DETAILED DESCRIPTION OF THE PREFERRED EMBODIMENTS

Figure 1:
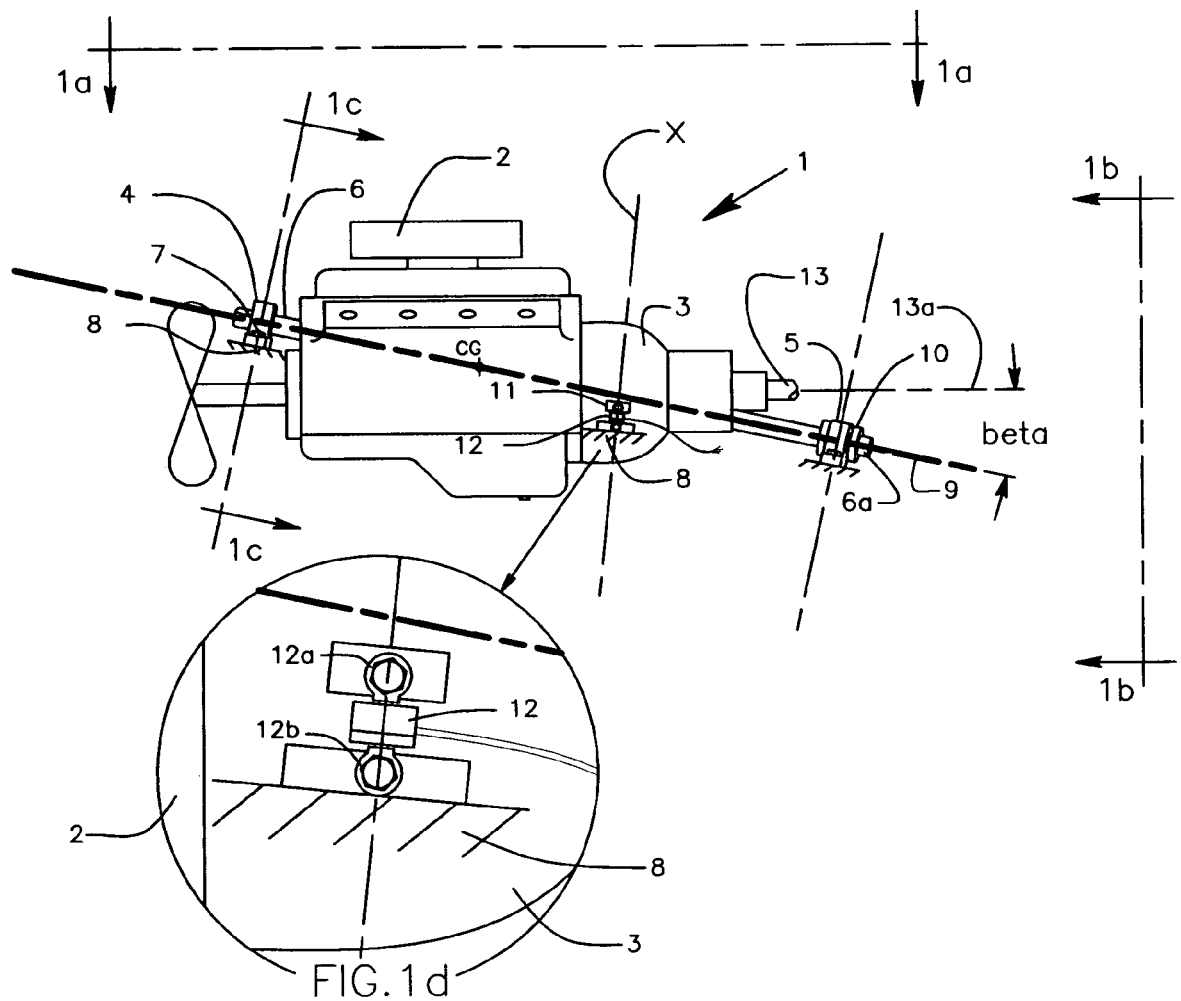
FIG. 1 is a side view of an engine mounted on a frame in accordance with one embodiment of the invention.
Figure 1A:
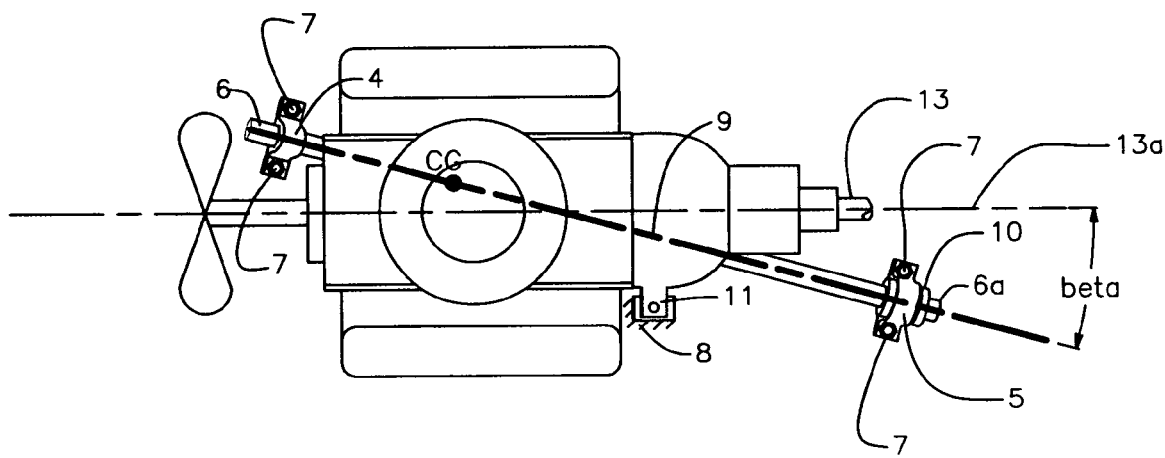
FIG. 1(a) is a top view of the engine and frame shown in FIG. 1, as seen from 1(a)-1(a) of FIG. 1.
Figure 1B:
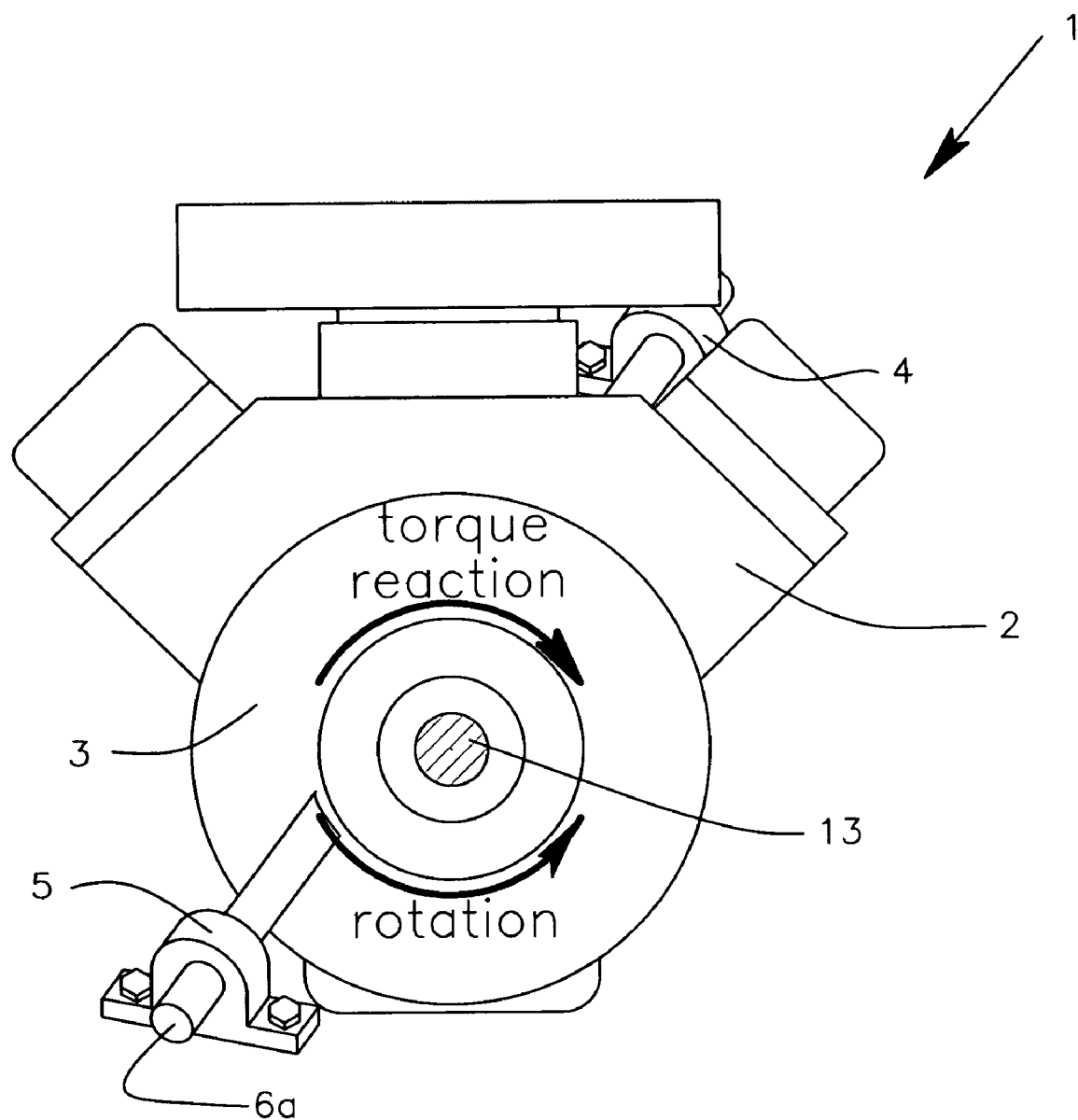
FIG. 1(b) is a rear view of the engine shown in FIG. 1, as seen from 1(b)-1(b) of FIG. 1.
Figure 1C:
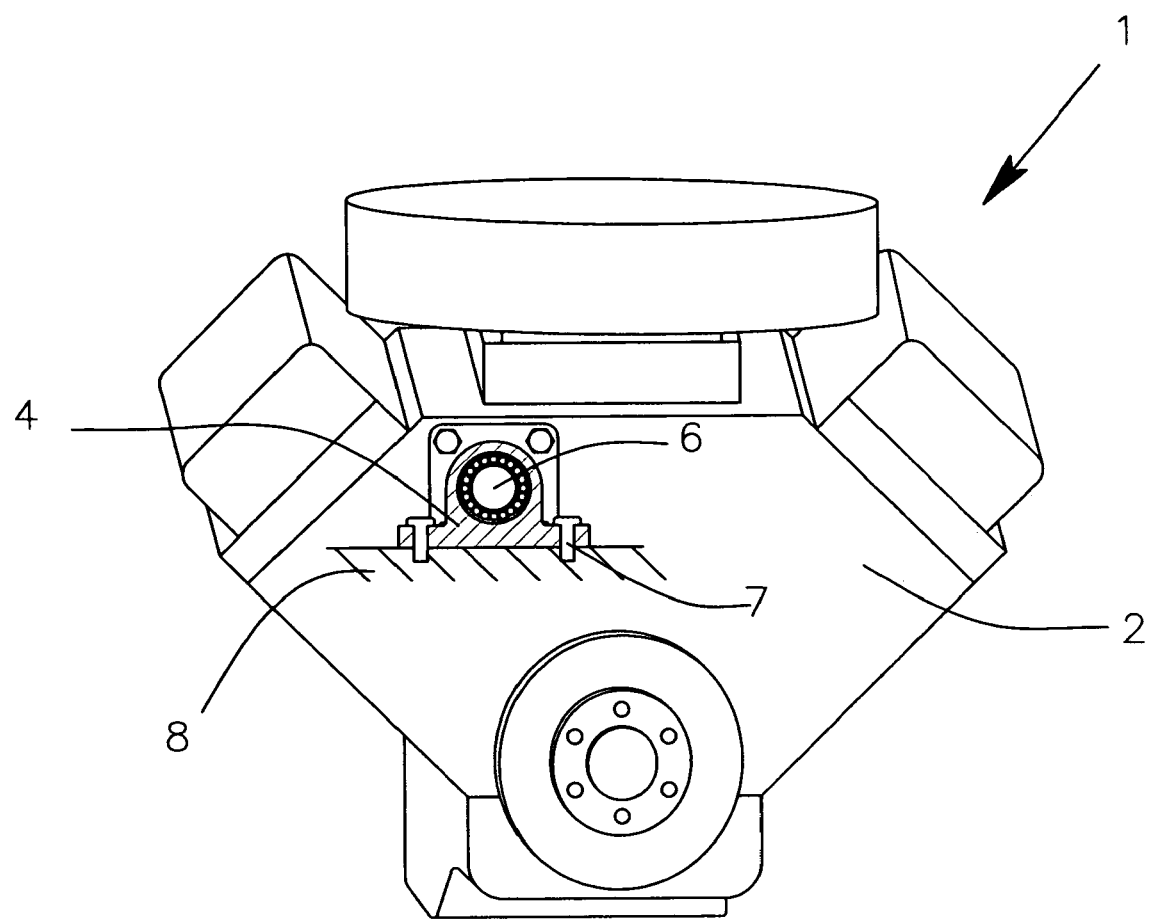
FIG. 1(c) is a sectional view of the engine shown in FIG. 1, as seen along 1(c)-1(c) of FIG. 1.

A first embodiment of the invention is shown in FIGS. 1 and 1(a). An engine 1 generally consists of internal combustion motor 2 and transmission assembly 3 as might be installed in any common automobile. The engine 1 is secured to the automobile frame 8 (partially shown) by bearings 4 and 5, which receive rigid extensions 6 and 6a of the engine 1, and which are pillow block bearings as are commonly known to the art, as, for example, Model No. G1105KRAB, manufactured by Torrington Company, a division of Ingersoll-Rand. Bolts 7 fasten the bearings 4 and 5 to the automobile frame 8. Bearings 4 and 5 are fitted to rigid extensions 6 and 6(a) of the engine. Stop collar 10 is located on shaft extension 6(a) to prevent fore and aft movement of the engine 1 in relation to the frame 8.

Bearings 4 and 5 form a pivotal axis 9 about which the mass of the engine may rotate. As will be discussed more fully below, pivotal axis 9 passes through or near the center of gravity CG of the engine 1. A lug 11 projects outwardly from the engine 1, and a load-sensing transducer 12 is connected between lug 11 and the automobile frame 8, as shown, for example, in U.S. Pat. No. 3,903,738, for measuring tension generated by the engine and transmitted to its output shaft 13.

Thus, it can be seen that the engine 1 is securely attached to the frame in that bearings 4 and 5, and stop collar 10 provide vertical, lateral and longitudinal support of the engine mass and define pivotal axis 9. Torque generated by the engine 1 and transmitted to the output shaft 13, creates a reaction torque that is restrained by the load-sensing transducer 12 and lug 11.

Load-sensing transducer 12 may be any suitable type known to the art, such as Model DSM Series transducers manufactured by Transducer Techniques of Rio Nedo, Temecula, Calif. The transducer 12 may be positioned in any convenient location radially displaced from the pivotal axis of the engine 1, as long as its axis of sensitivity, $\chi$ on FIG. 1, is so oriented as to measure the torque. Since the transducer 12 does not form a part of, and is in fact independent of, the means by which the engine is retained to the frame, it may be easily repaired or replaced.

Thus, for example, the angle beta, which is the angle between the axis of rotation of the engine output shaft 13 and the pivotal axis 9, projected onto and measured on a mutually parallel plane to both the pivotal axis 9 and axis of rotation of the output shaft 13, can have any value other than ninety degrees. If angle beta had a value of ninety degrees, the bearings 4 and 5 would resist the reaction torque created as a result of engine torque transmitted by the output shaft 13 and the load-sensing transducer 12 would not sense a load in proportion to the engine torque.

The axis of sensitivity $\chi$ is defined as the axis of the resultant force vector acting on the point of contact on the engine measured by load sensing transducer 12, and cannot share any plane with the pivotal axis. If $\chi$ did share a plane with the pivotal axis, the load-sensing transducer 12 would not sense a load in proportion to the engine torque.

As mentioned previously, the center of gravity CG of the engine 1 is on or near pivotal axis 9. When the center of gravity CG is positioned exactly on pivotal axis 9, all engine retention loads except torque are provided by the bearings 4 and 5, and stop collar 10, so that the load on the load-sensing transducer 12 is purely a function of engine torque.

If the center of gravity CG is displaced laterally of the pivotal axis 9, a static torque will be measured by the load-sensing transducer 12 proportional to the weight of the engine 1 and the lateral displacement of the center of gravity CG from pivotal axis 9. This static load could be removed by zero offset calibration of the load-sensing transducer 12. However, if the automobile is moving and passes over bumps in the road or is traveling uphill or downhill, acceleration-induced forces will be generated. These forces are dynamic, not easily cancelled and thus would represent errors in engine torque measurement.

As shown in FIG. 1, pivotal axis 9 extends at an angle to the horizontal. This angle is a result of typical automobile configuration of low output shafts on the transmission and heavy engines with elevated centers of gravity. This angle is common even in front wheel drive automobiles with transversely mounted engines. The lateral displacement of the CG as discussed above would also result in acceleration induced loads on the load-sensing transducer 12 during braking and speed increases. These forces also are dynamic, not easily cancelled, and thus would also represent errors in engine torque measurement. Similarly, if the CG was vertically displaced from axis 9, the load-sensing transducer 12 would experience dynamic loads induced by cornering acceleration.

Although the engine torque measurement will be most accurate if pivotal axis 9 passes directly through the CG as shown in FIGS. 1 and 1(a), the present invention contemplates that pivotal axis 9 passes sufficiently near the CG as to accomplish the accuracy required in torque measurement and the acceleration envelope in which the vehicle will operate while taking measurements. Thus, a family sedan driven on smooth freeways rarely experiences more than one tenth of gravity acceleration and if the torque information is used to determine transmission shift points, perhaps 10% measurement accuracy is adequate. However, a race car running on a rough dirt oval track will be subjected to one times the acceleration of gravity and will probably require 1% measurement accuracy to better tune the engine.

By way of example:

$$F = W \times A / 32.2 \, fps^2$$

Where:
F=force in pounds
A=acceleration in feet per second squared
W=engine weight in pounds $$Lm = T\% \times Tm \times 12 / (F \times 100)$$

Where:
Lm=length of mislocation in inches
T %=percentage of torque measurement accuracy
Tm=torque output of the motor in pound feet
F=force in pounds For the purposes of these examples, assume that the engine of both the family sedan and the race car is a 350 cubic inch motor and transmission weighing 750 pounds. The motor has a maximum torque output of 350 pound feet. In the case of the family sedan, F=750 lb×3.22 $fps^2$/32.2 $fps^2$=75 lb. For a desired torque measurement accuracy of 10%, Lm=10%×350 lb-ft×12/(75 lb×100)=5.6 inches. Therefore, in order to achieve a 10% torque measurement accuracy in the family sedan which experiences a one tenth of one gravity cornering acceleration, pivotal axis 9 must pass within 5.6 inches of the engine CG.

In the case of the race car, F=750 lb×32.2 $fps^2$/32.2 $fps^2$=750 lb. For a desired torque measurement accuracy of 1%, Lm=1%×350 lb-ft×12/(750 lb×100)=0.056 inches. Therefore, in order to achieve a 1% torque measurement accuracy in the race car which experiences one gravity cornering acceleration, pivotal axis 9 must pass within 0.056 inches of the engine CG.

The examples discussed above are, of course, intended only as examples, and should not be understood as limiting the invention, and there are many different vehicles operated under different conditions in which the invention disclosed herein could be adapted with minor variations by a person of ordinary skill in the art. To determine an acceptable location of the pivotal axis relative to the engine CG, the specific application should be considered together with the calculations. For instance, a drag race car only races in straight lines on smooth surfaces and would not require accurate location of the pivotal axis relative to the CG to eliminate cornering acceleration forces.

Quite often, the pivotal axis is near enough to the CG when the CG is within the volume defined by the conical shaped space formed by the center of one bearing and the circle defined by the surfaces of relative motion of the other bearing.

In the following alternate embodiment of the invention, the engine restraints are compatible with a three point mounting system similar to that disclosed in Etchells, U.S. Pat. No. 2,953,336. Thus, as will be discussed in greater detail below, bearing 5 of FIG. 1 becomes a compliant rubber mount, while bearing 4 of FIG. 1 becomes segmented and compatible with the standard pair of forward engine mounts well known in the art. Together, the two bearings, one being segmented, constrain the engine from movement with respect to the vehicle frame, except for the small amount of rotation about a pivotal axis which enables torque measurement.

Figure 2:
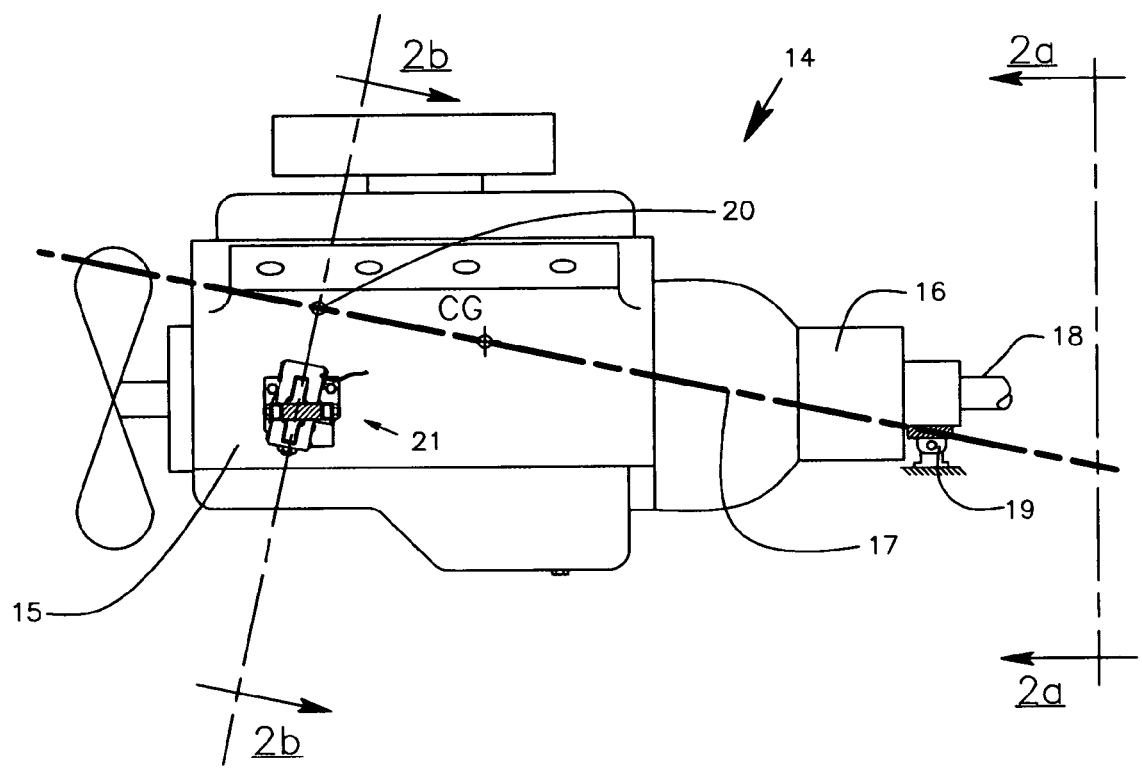
FIG. 2 is a side view of an engine mounted in accordance with another embodiment of the invention.
Figure 2A:
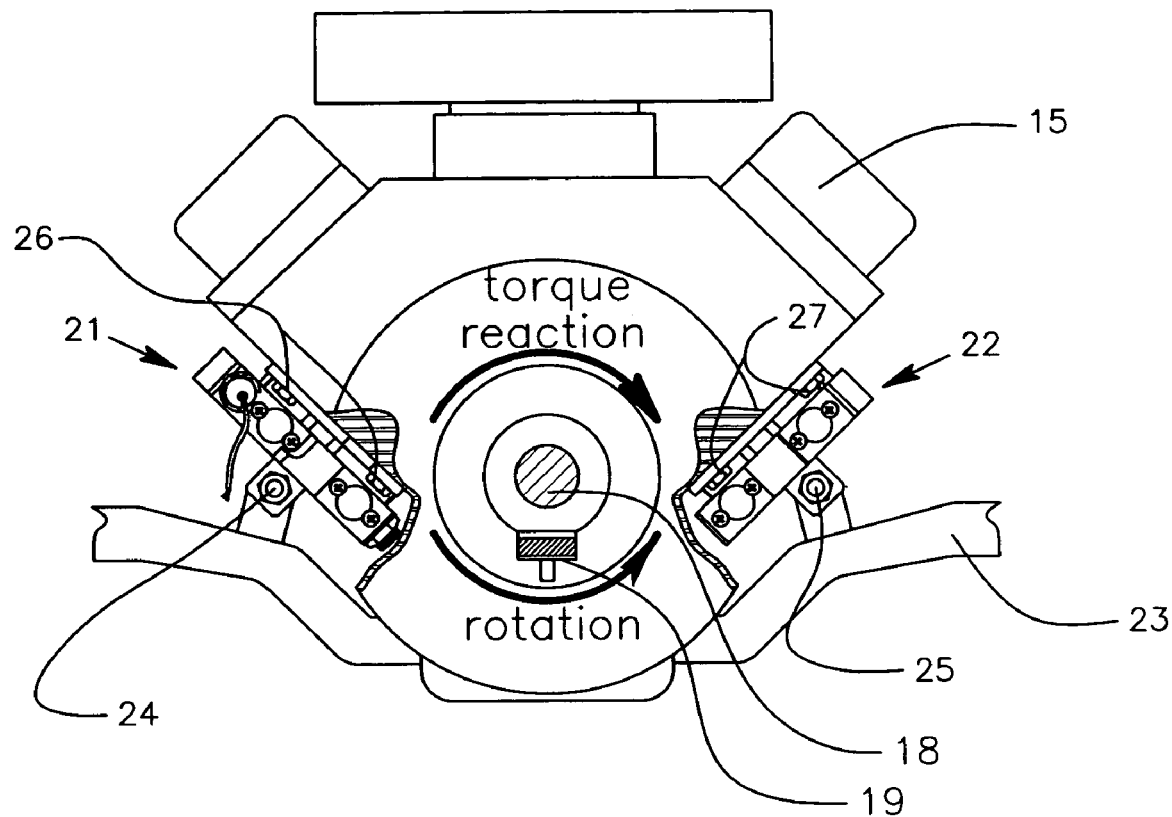
FIG. 2(a) is a rear view of the engine shown in FIG. 2, as seen from 2(a)-2(a) of FIG. 2.
Figure 2B:
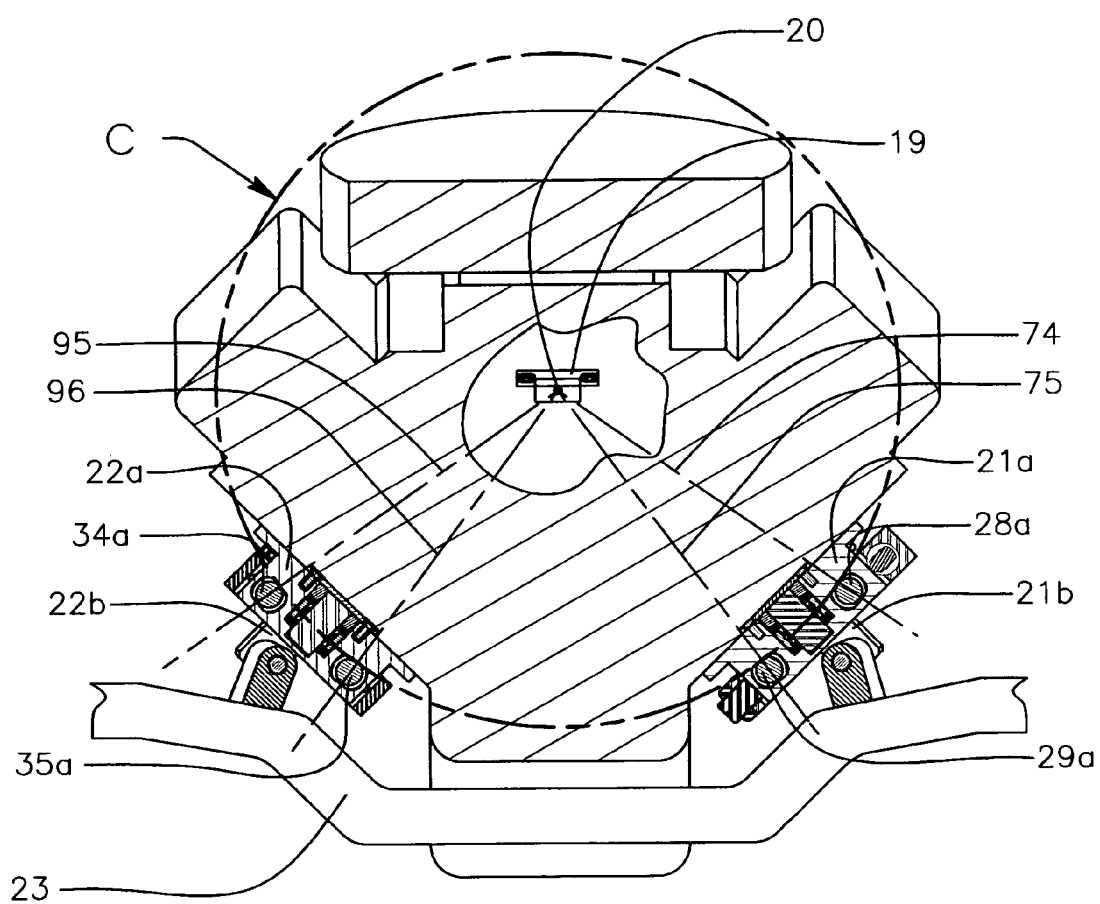
FIG. 2(b) is a cross-sectional view of the engine and frame shown in FIG. 2, taken along the line 2(b)-2(b) of FIG. 2, and broken away to show the rear bearing.

Thus, as shown in FIGS. 2, 2(a), and 2(b), another embodiment of the invention comprises an engine 14 including internal combustion motor 15 and transmission assembly 16 as might be installed in any common automobile. As will be explained, the engine mounting system according to this embodiment of the invention provides the same separation of engine retention forces from torque force measurement as provided by the previously described embodiment shown in FIGS. 1 and 1(a), but has the further advantage of being compatible with the three point engine mounting systems widely used by many automobile manufacturers.

As in the first embodiment, pivotal axis 17 passes through or at least near the center of gravity CG of the engine 14. Near the transmission output shaft 18 is a compliant rubber engine mount 19 as in U.S. Pat. No. 2,953,336, which acts as a bearing in that it positions one end of the pivotal axis 17, in much the same way as the pillow block forming bearing 5 defined one end of the pivotal axis 9 in the previously-discussed embodiment. As will be explained below, bearing segments 21 and 22, securely attach engine 14 to the vehicle frame 23, as best shown in FIG. 2(b).

Figure 3:
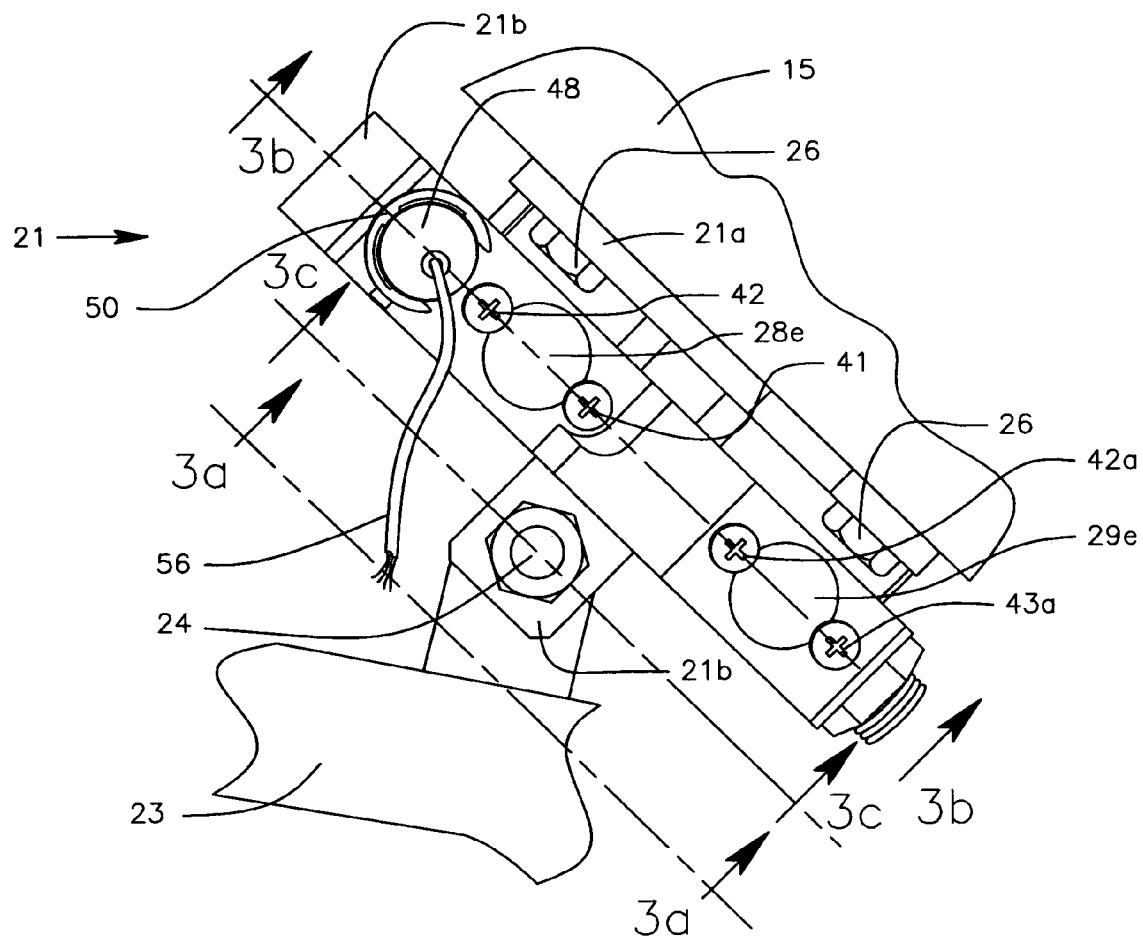
FIG. 3 is an enlarged rear view of a bearing segment shown in FIG. 2(a).
Figure 3A:
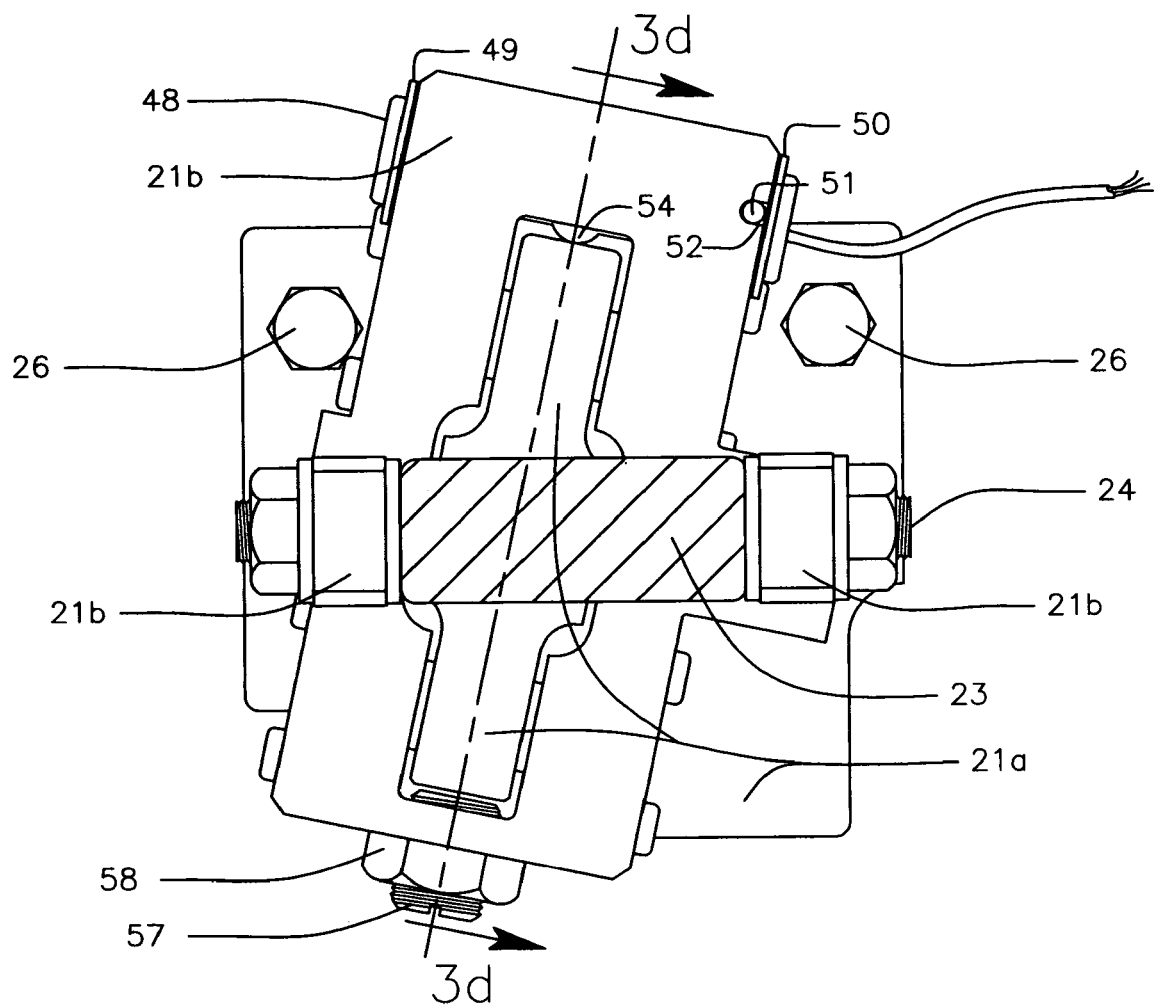
FIG. 3(a) is a view of the bearing segment shown in FIG. 3, as seen along the line 3(a)-3(a) of FIG. 3.
Figure 3B:
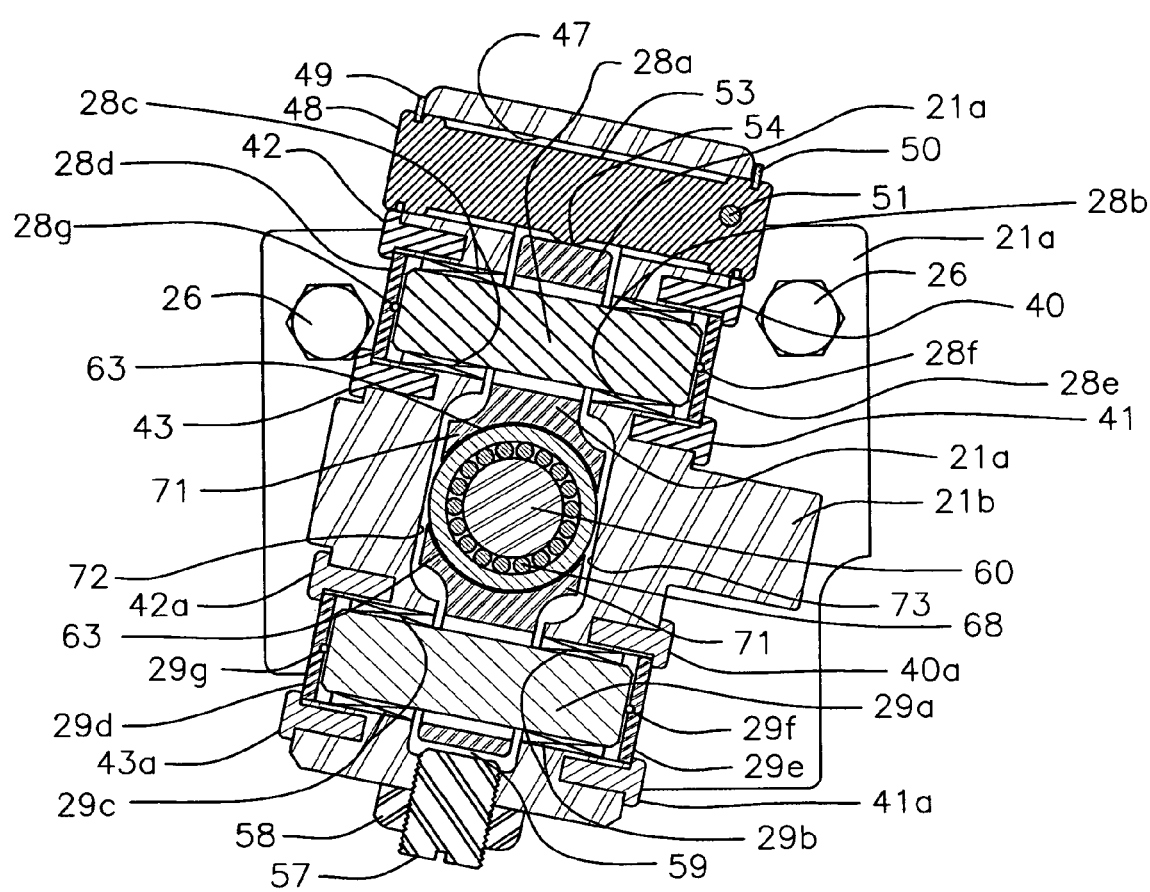
FIG. 3(b) is a cross-sectional view of the bearing segment shown in FIG. 3, as seen along the line 3(b)-3(b) of FIG. 3.
Figure 3C:
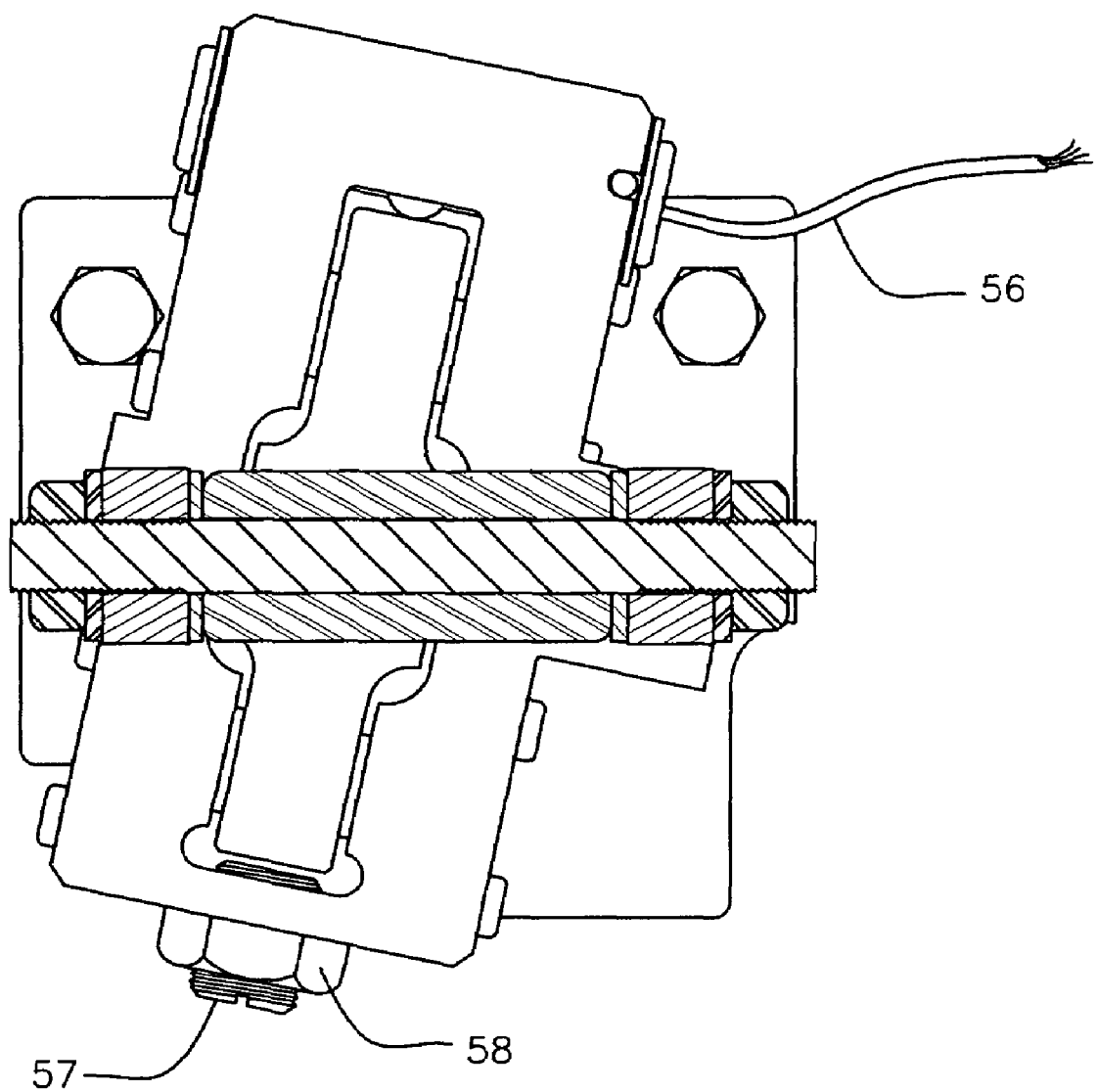
FIG. 3(c) is a cross-sectional view of the bearing segment shown in FIG. 3, as seen along the line 3(c)-3(c) of FIG. 3.
Figure 3D:
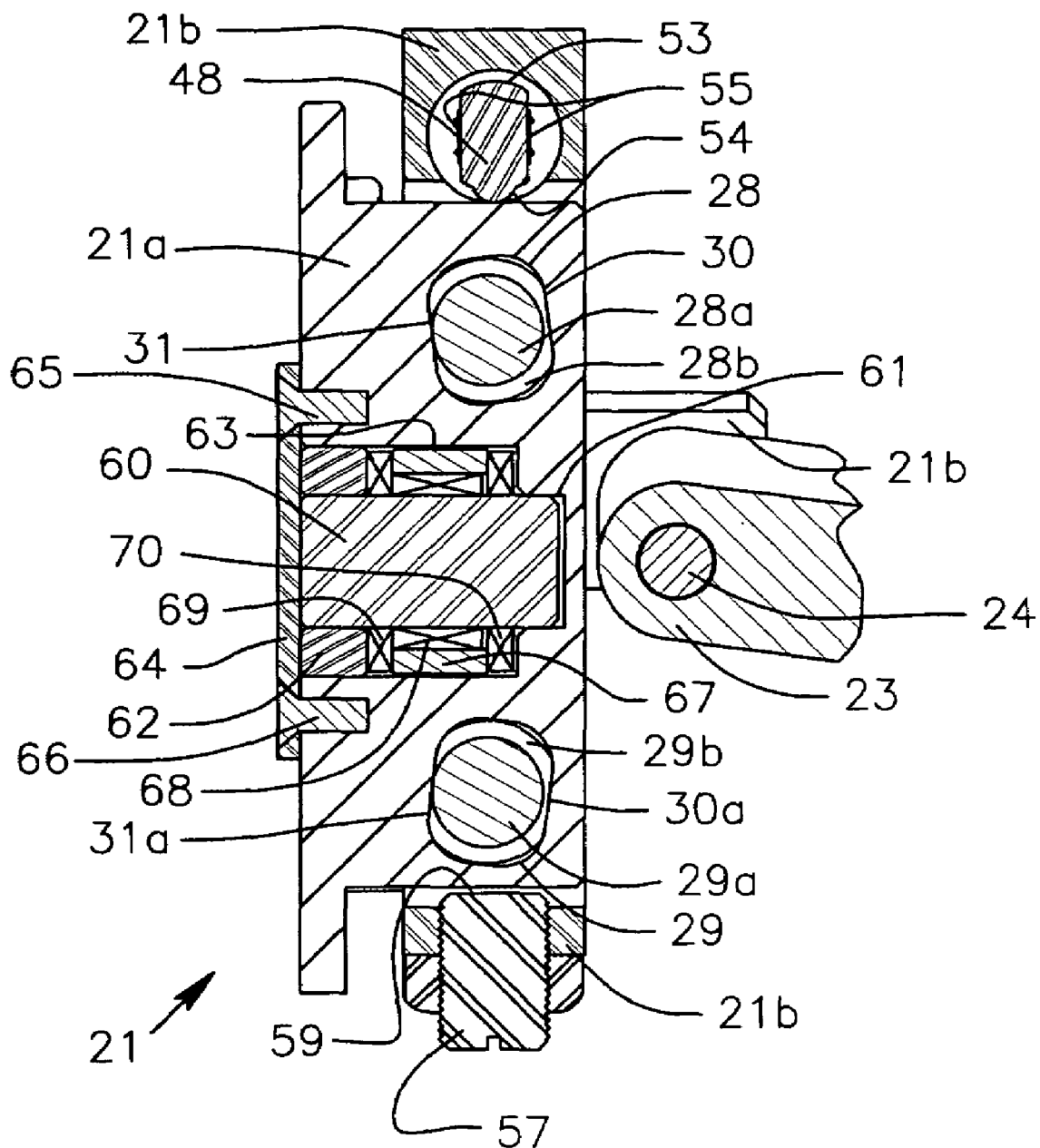
FIG. 3(d) is a cross-sectional view of the bearing segment shown in FIG. 3(a), as seen along the line 3(d)-3(d) of FIG. 3(a).
Figure 3E:
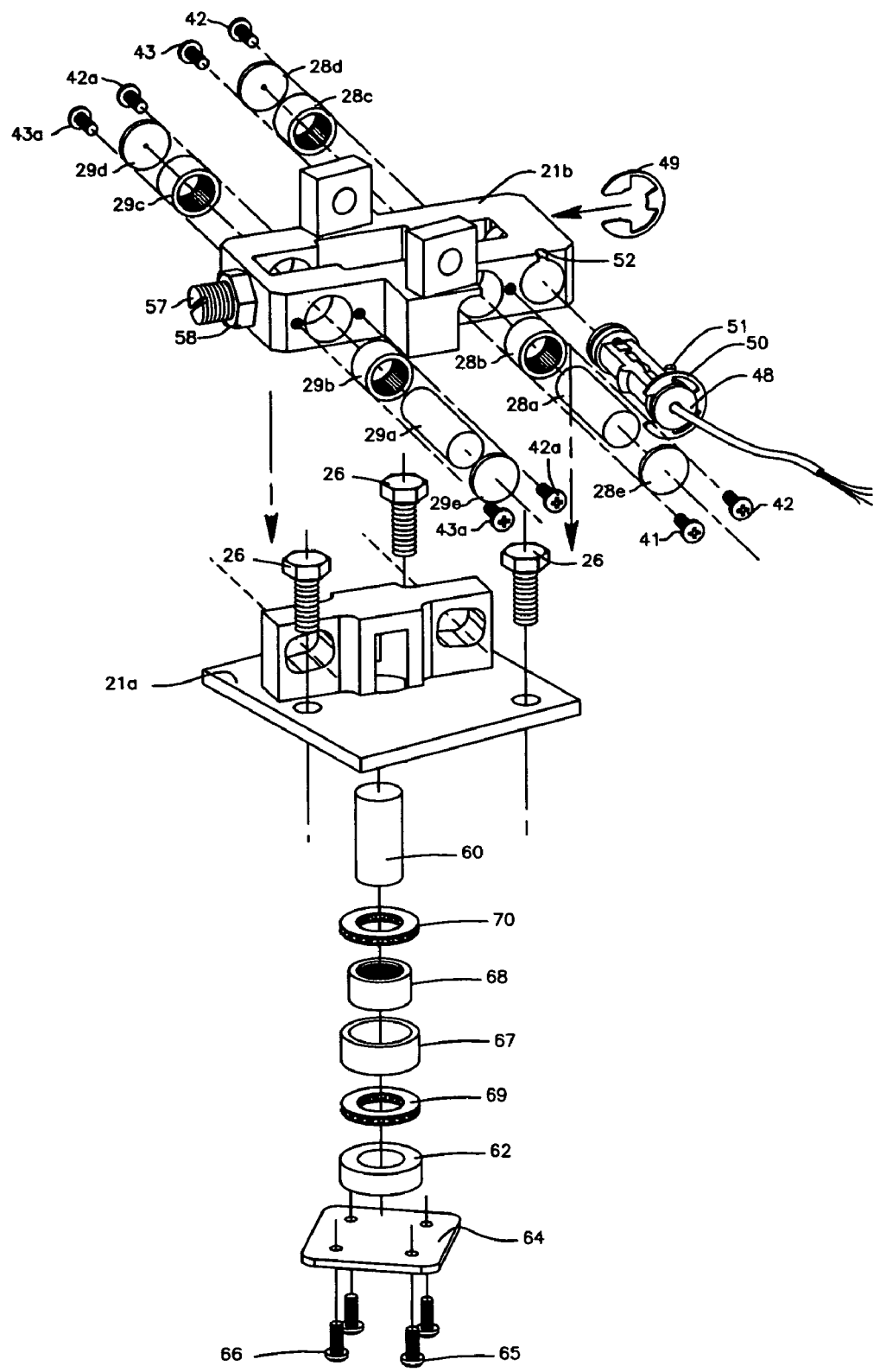
FIG. 3(e) is an exploded view showing the parts comprising the bearing segment shown in FIG. 3.

Referring to FIGS. 3, 3(a), and 3(e), bearing segment 21 comprises an engine component 21(a) attached to the engine 14 by bolts 26. Bearing segment 21 further comprises a frame component 21(b) attached to the automobile frame 23 by bolt 24. Engine component 21(a) has an elongated upper track 28 formed with inner track surface 31 and outer track surface 30. Inner track surface 31 and outer track surface 30 are parallel to each other. Pin 28(a), passing through the upper track 28, is rotationally mounted within the frame component 21(b) by means of roller bearings 28(b) and 28(c). Similarly, engine component 21(a) has an elongated lower track 29 formed with inner track surface 31(a) and outer track surface 30(a). Inner track surface 31(a) and outer track surface 30(a) are parallel to each other. Pin 29(a), passing through the lower track 29, is rotationally mounted within the frame component 21(b) with roller bearings 29(b) and 29(c), the pin and track thus forming surfaces of relative rotation, as above described.

Pin 28(a) is retained within the frame component 21(b) by disk 28(d), disk 28(e), bearing 28(f), bearing 28(g), screw 40, screw 41, screw 42, and screw 43. Similarly, pin 29(a) is retained within the frame component 21(b) by disk 29(d), disk 29(e), bearing 29(f), bearing 29(g), screw 40(a), screw 41(a), screw 42(a), and screw 43(a).

Load sensor 48 is retained within bore 47 formed in the frame component 21(b) by snap ring 49 and snap ring 50. Pin 51 is press fitted within load sensor 48 and closely fitted within slot 52 of the frame component 21(b) to assure angular alignment of the sensor 48 with the frame component 21(b). The load sensor 48 has a reduced intermediate diameter 53 with a bump 54. The load sensor 48 is equipped with strain gages 55 connected by wire 56 for remote electrical measurement of transducer signals resulting from loads applied to the bump 54. The stop screw 57 threadedly engages the frame component 21(b) and is locked in place by nut 58 with a small gap 59 between the stop screw 57 and the engine component 21(a). In any case, the load sensor may be replaced for repair without disturbing retention of the engine to the frame.

Shaft 60 is closely fitted to engine component 21(a) within bore 61 on one end and supported on the other end by ring 62 which is closely fitted in bore 63 of the engine component 21(a). The plate 64 is threadedly secured by screw 65 and screw 66 to the engine component 21(a) and retains the shaft 60 within engine component 21(a). The tire 67, which rides radially on needle bearings 68 and rides axially on thrust bearing 69 and thrust bearing 70, is fixed longitudinally and free to rotate within engine component 21(a) about shaft 60. The bore 63 and the outer diameter of the tire 67 exceed the width of the engine component 21(a) in the middle section 71 in vicinity of the tire 67. Thus, the tire 67 is exposed for rolling engagement with the frame component 21(b) on surface 72 and surface 73 and will prevent the engine component 21(a) from rubbing on frame component 21(b) when loads are applied along the pivotal axis 17.

Referring to FIGS. 3(d), 3(e), and 2(b), it can be seen that the engine component 21(a) is free to roll on pin 28(a) and pin 29(a) along the track surface 31 and track surface 31(a) about a pivotal point 20 located on the pivotal axis 17. Pivotal point 20 is located at the intersection of lines of projection 74 and 75. Line of projection 74 extends from the center of pin 28(a) through the contact point of pin 28(a) on track surface 31, in a plane perpendicular to the pivotal axis 17. Similarly, line of projection 75 extends from the center of the pin 29(a) through the contact point of pin 29(a) on track surface 31(a), in a plane perpendicular to the pivotal axis 17.

The range of rotational motion of the engine 14 is limited to the small gap 59 between engine component 21(a) and stop screw 57. Arcuate motion of the engine component 21(a) is limited in one direction by the load sensor 48, mounted in the bore 47 of the frame component 21(b) which is attached to the frame 23 with bolt 24. The force of the engine component 21(a), as a result of torque reaction to engine 14 torque delivered to the output shaft 18, bearing on the bump 54 on the load sensor 48, deflects the load sensor 48 causing a detectable change in output of the load sensor 48 proportional to engine 14 torque. Arcuate motion, caused by opposite engine torque from that described above, of the engine component 21(a) is limited by the stop screw 57 threadedly engaged in the frame component 21(*b*) which is attached to the frame 23 with bolt 24. This motion will not load the load sensor 48 or create a detectable change in output. Thus, it will be understood that the transducer includes parts connected by engine and frame components 21(*a*) and 21(*b*) to the engine and frame, respectively.

Figure 4:
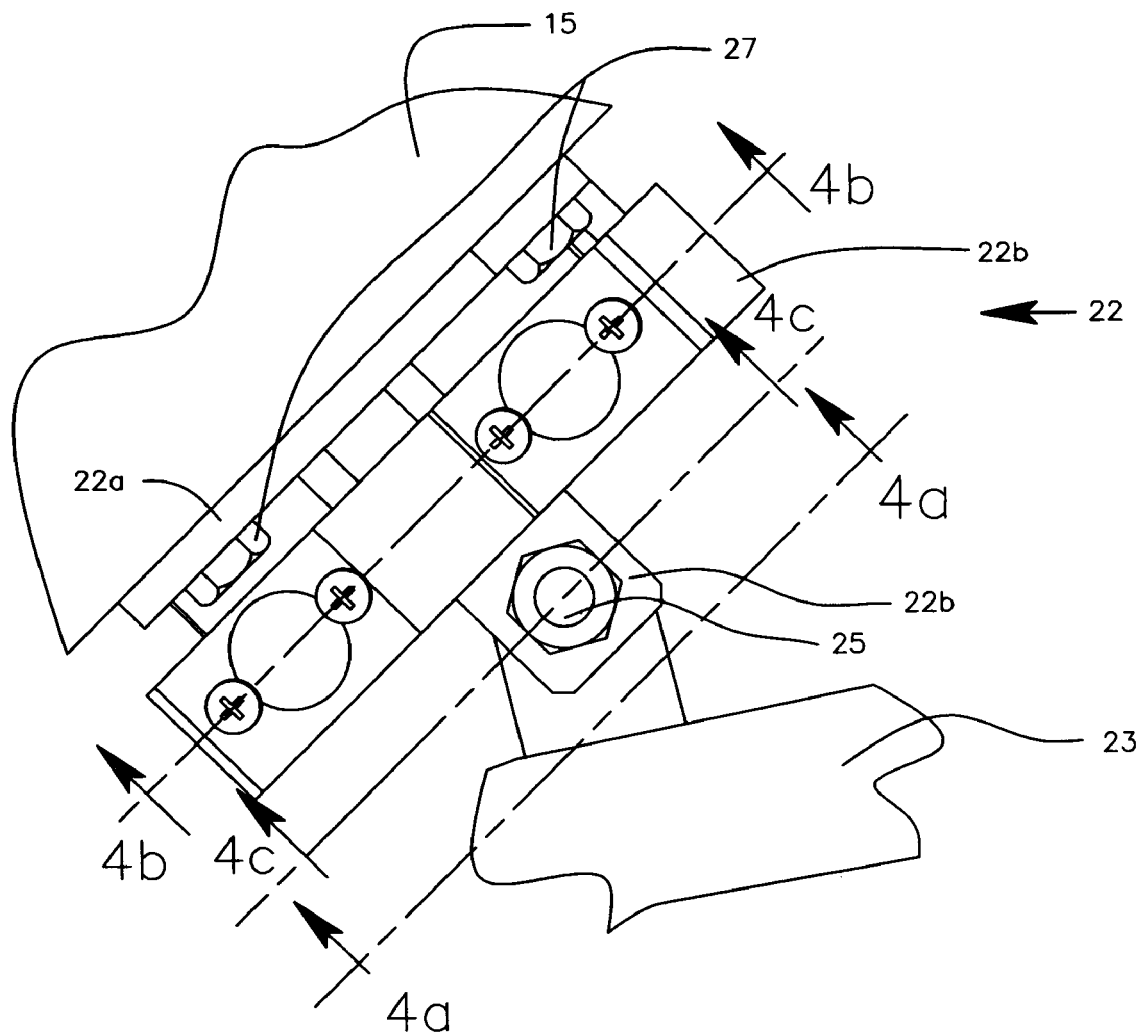
FIG. 4 is an enlarged rear view of a bearing segment shown in FIG. 2(a).
Figure 4A:
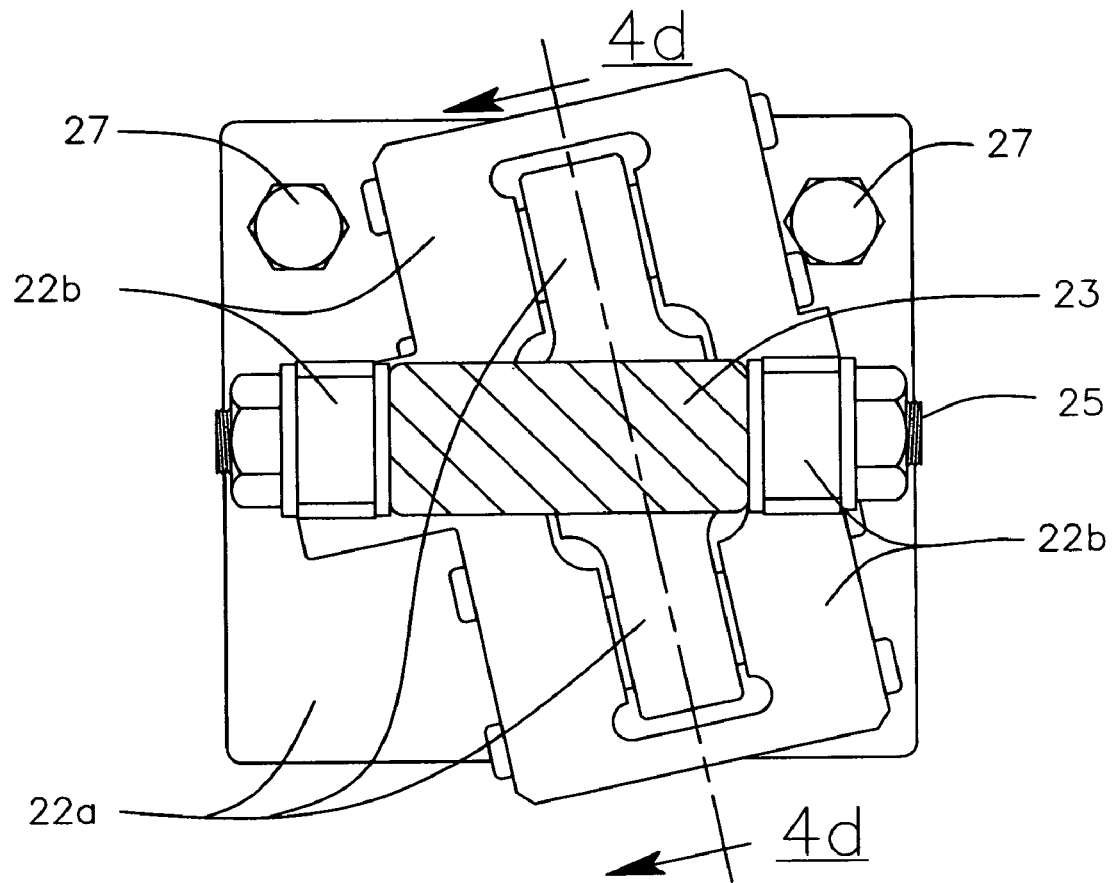
FIG. 4(a) is a view of the bearing segment shown in FIG. 4, as seen along the line 4(a)-4(a) of FIG. 4.
Figure 4B:
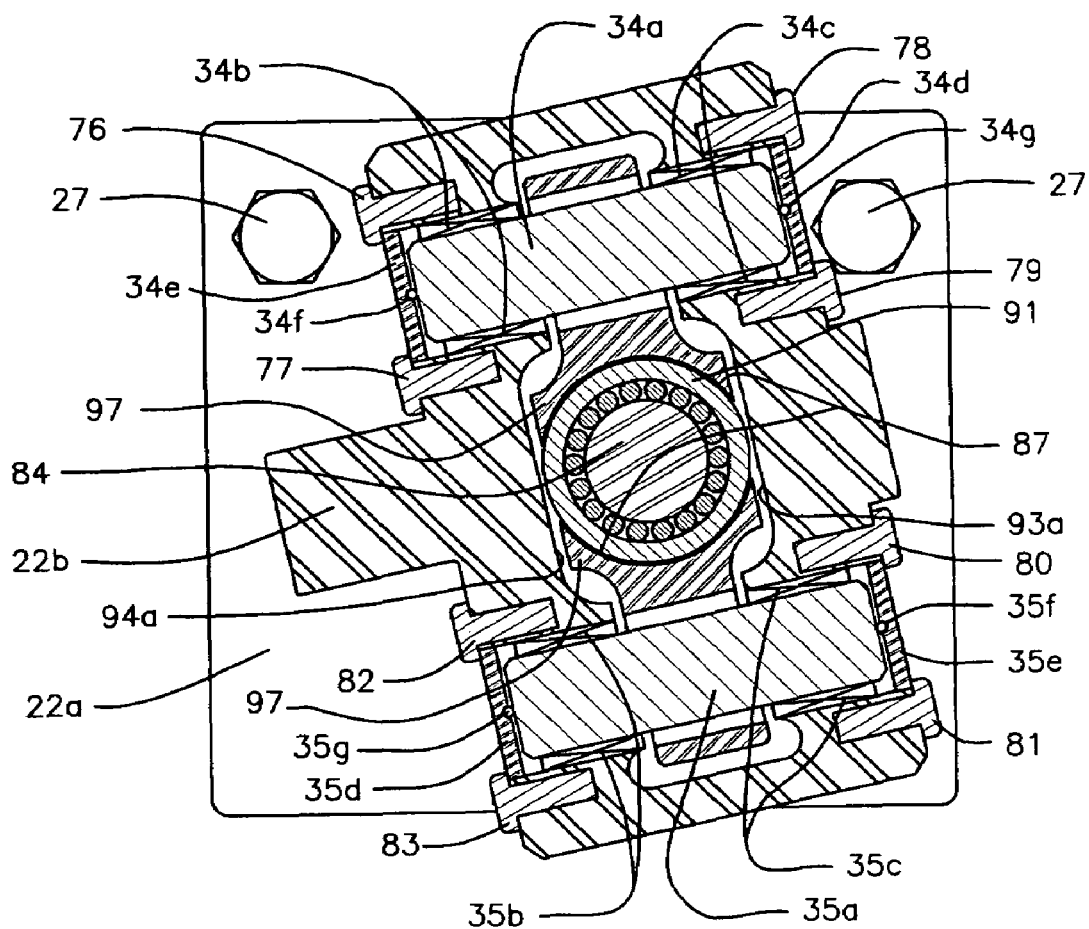
FIG. 4(b) is a cross-sectional view of the bearing segment shown in FIG. 4, as seen along the line 4(b)-4(b) of FIG. 4.
Figure 4C:
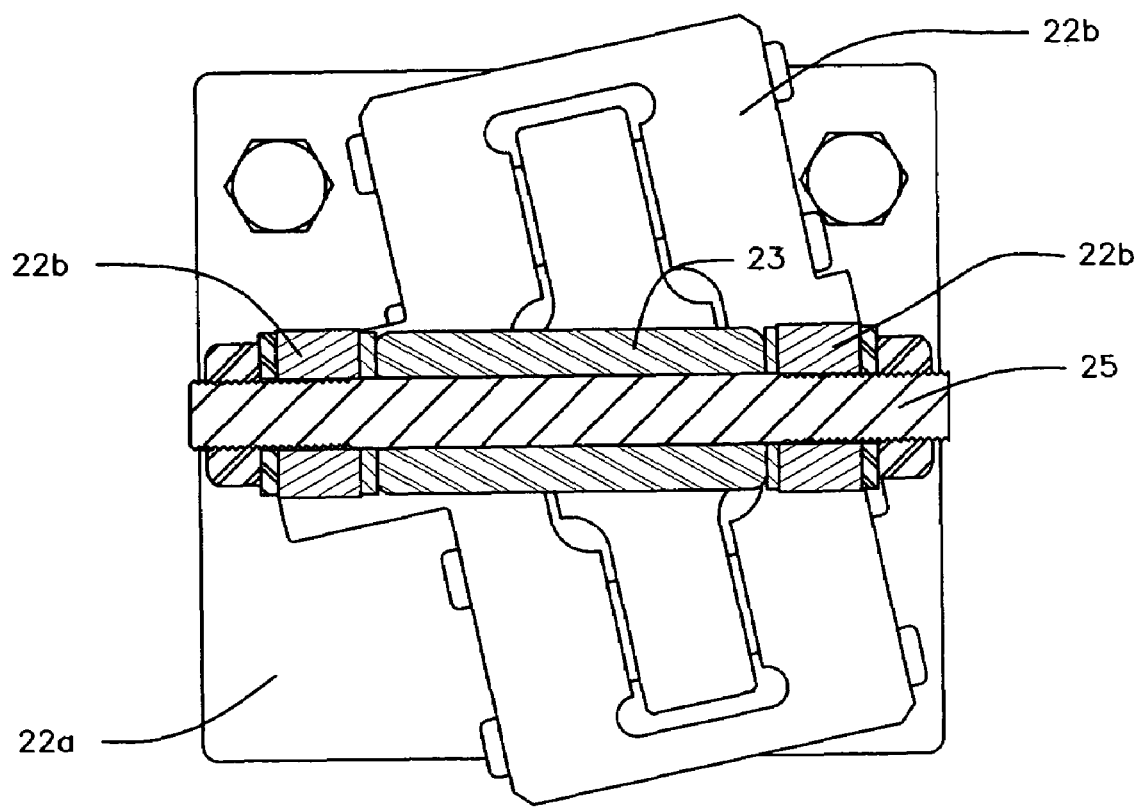
FIG. 4(c) is a cross-sectional view of the bearing segment shown in FIG. 4, as seen along the line 4(c)-4(c) of FIG. 4.
Figure 4D:
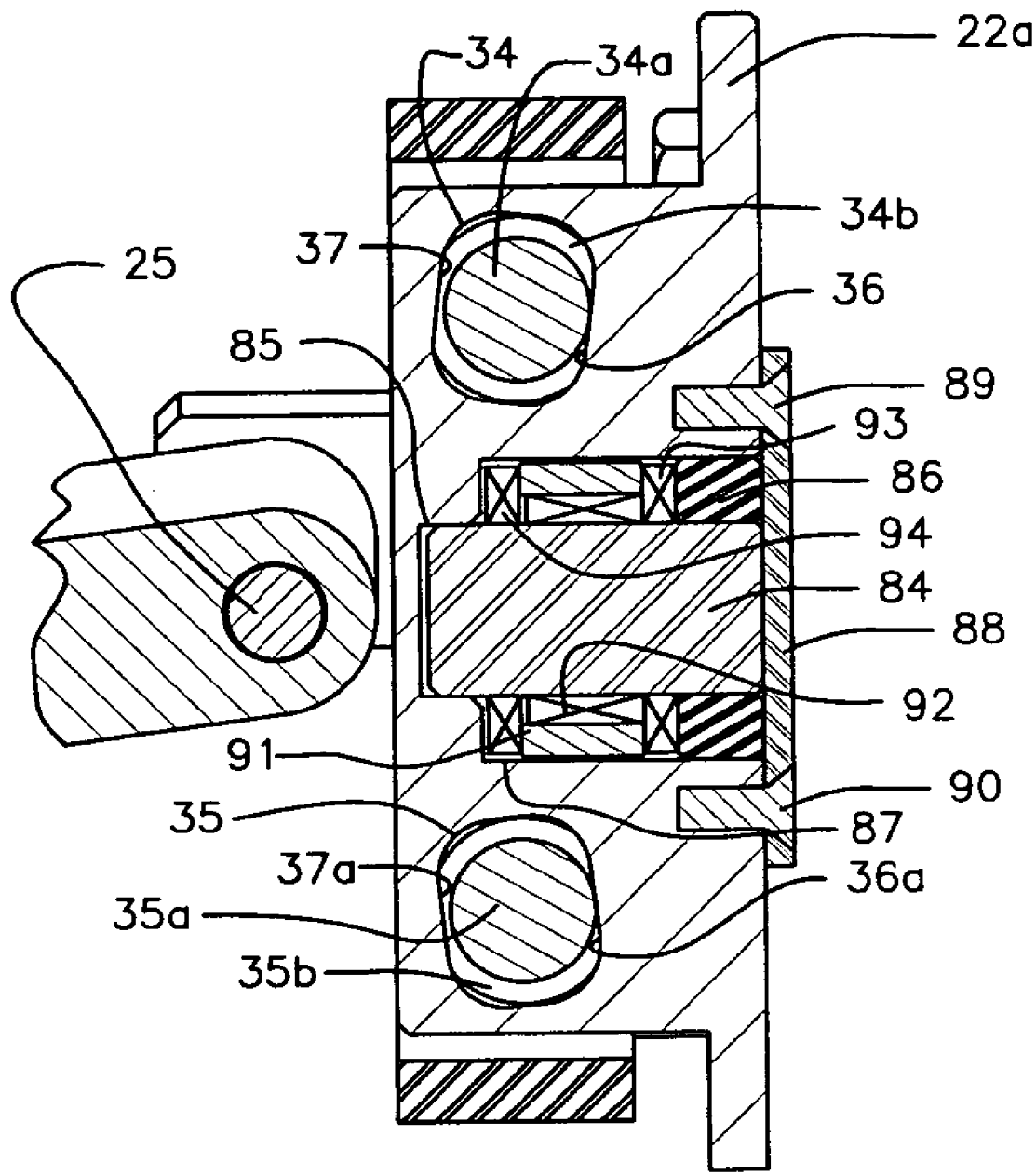
FIG. 4(d) is a cross-sectional view of the bearing segment shown in FIG. 4(a), as seen along the line 4(d)-4(d) of FIG. 4(a).

FIG. 4 is an enlarged view of the bearing segment 22 shown in FIG. 2(*a*) with section lines to define the cross-sectional view of FIGS. 4(*a*), 4(*b*), and 4(*c*). FIG. 4(*d*) is a cross-sectional view of bearing segment 22 taken along the section lines defined in FIG. 4(*a*). Referring to FIGS. 4 and 2(*a*), bearing segment 22 comprises a engine component 22(*a*) attached to the engine 14 by bolts 27. Bearing segment 22 further comprises a frame component 22(*b*) attached to the automobile frame 23 by bolt 25.

Referring to FIGS. 4(*b*), 4(*d*), and 2(*b*), engine component 22(*a*) has an elongated upper track 34 formed with inner track surface 36 and outer track surface 37. Inner track surface 36 and outer track surface 37 are parallel to each other. Passing through the upper track 34 is pin 34(*a*) rotationally mounted within the frame component 22(*b*) by means of roller bearings 34(*b*) and 34(*c*). Similarly, the engine component 22(*a*) has an elongated lower track 35 formed with inner track surface 36(*a*) and outer track surface 37(*a*). Inner track surface 36(*a*) and outer track surface 37(*a*) are parallel to each other. Passing through the lower track 35 is pin 35(*a*) rotationally mounted within the frame component 22(*b*) with roller bearings 35(*b*) and 35(*c*).

Referring to FIGS. 4 and 4(*b*), pin 34(*a*) is retained within the frame component 22(*b*) by disk 34(*d*), disk 34(*e*), bearing 34(*f*), bearing 34(*g*), screw 76, screw 77, screw 78, and screw 79. Similarly, pin 35(*a*) is retained within the frame component 22(*b*) by disk 35(*d*), disk 35(*e*), bearing 35(*f*), bearing 35(*g*), screw 80, screw 81, screw 82 and screw 83.

Referring to FIGS. 2, 4, 4(*b*), and 4(*d*), shaft 84 is closely fitted to engine component 22(*a*) within bore 85 on one end and supported on the other end by ring 86 which is closely fitted in bore 87 of the engine component 22(*a*). The plate 88 is threadedly secured by screw 89 and screw 90 to the engine component 22(*a*) and retains the shaft 84 within engine component 22(*a*). The tire 91 riding radially on needle bearings 92 and riding axially on thrust bearing 93 and thrust bearing 94 is fixed longitudinally and free to rotate within engine segment 22(*a*) about shaft 84. The bore 87 and the outer diameter of the tire 91 exceed the width of the engine component 22(*a*) in the middle section 97 in vicinity of the tire 91. Thus, the tire 91 is exposed for rolling engagement with the frame component 22(*b*) on surface 93(*a*) and surface 94(*a*) and will prevent the engine component 22(*a*) from rubbing on frame component 22(*b*) when loads are applied along the pivotal axis 17.

Referring to FIGS. 4(*d*) and 2(*b*), and from the above discussion, it is apparent that the engine component 22(*a*) is free to roll on pin 34(*a*) and pin 35(*a*) along the track surfaces 36 and 36(*a*) about a pivotal point 20 located on pivotal axis 17. Pivotal point 20 is located at the intersection of lines of projection 95 and 96. Line of projection 95 extends from the center of pin 34(*a*) through the contact point of pin 34(*a*) on track surface 36, in a plane perpendicular to the pivotal axis 17. Similarly, line of projection 96 extends from the center of the pin 35(*a*) through the contact point of pin 35(*a*) on track surface 36(*a*), in a plane perpendicular to the pivotal axis 17. The relative upward and downward motion between the engine component 22(*a*) and the frame component 22(*b*) is limited within the bearing segment 21 as discussed above.

More particularly, as shown in FIG. 2(*b*), bearing segments 21 and 22 are located on the circle indicated at "C", and allow the engine 14 to undergo a limited range of rotational movement about the pivotal axis 17. Thus, as previously described, it can be seen that the CG lies within the cone containing the center of the surfaces of relative motion of the compliant engine mount 19 and the circle "C". Viewed in this way, it is seen that the bearing segments 21 and 22 effectively replace bearing 4 of the first embodiment shown in FIG. 1.

Figure 5:
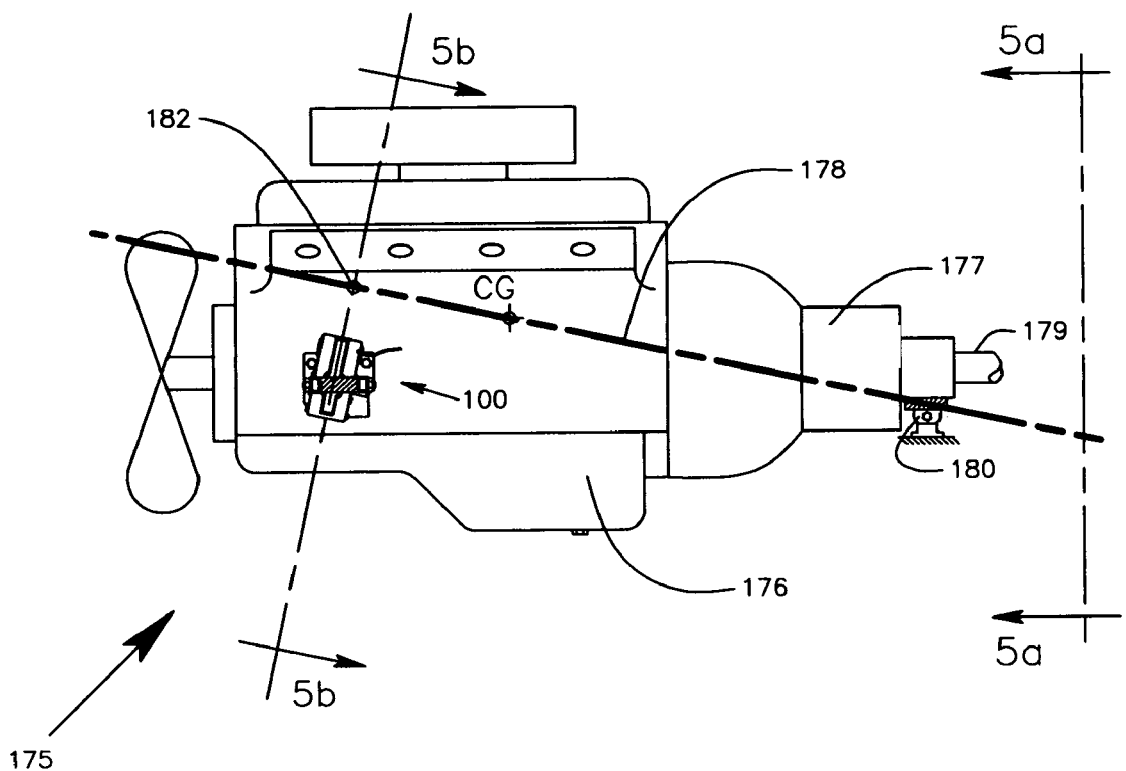
FIG. 5 is a side view of an engine mounted on a frame in accordance with a further embodiment of the invention.
Figure 5A:
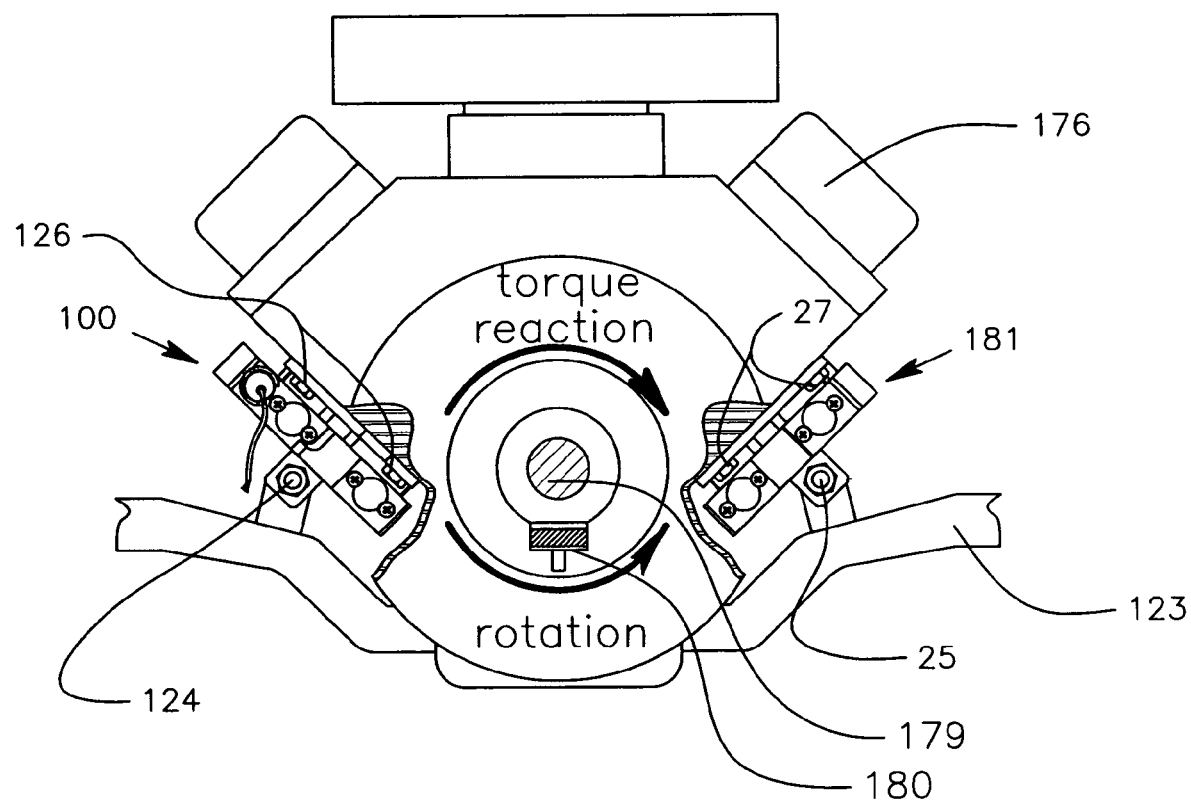
FIG. 5(a) is a rear view of the engine and frame shown in FIG. 5.

FIGS. 5, 5(*a*), and 5(*b*) disclose a further embodiment of the invention. An engine 175 comprises an internal combustion motor 176 and transmission 177 assembly as might be installed in any common automobile. The engine mounting system according to this embodiment of the invention provides the same separation of engine retention forces from torque force measurement as provided by the previously described embodiments, and is compatible with the three point engine mounting systems widely used by many automobile manufacturers.

FIG. 5 is a side view of the engine 175 having a pivotal axis 178 passing through or near the center of gravity CG of the engine 175. Near the transmission output shaft 179 is a compliant rubber mount 180 which positions one end of the pivotal axis 178, in much the same way as bearing 5 defined one end of the pivotal axis 9 in the first embodiment discussed herein. Bearing segments 100 and 181, as will be explained below, securely attach engine 175 to the vehicle frame 123, shown in FIGS. 5(*a*) and 5(*b*), and define the location of pivotal point 182 on the pivotal axis 178 as shown in FIG. 5(*b*).

Bearing segment 181 is constructed in the same manner as bearing segment 22 described in detail above and shown in FIGS. 4, 4(*a*), 4(*b*), 4(*c*), and 4(*d*).

Figure 6:
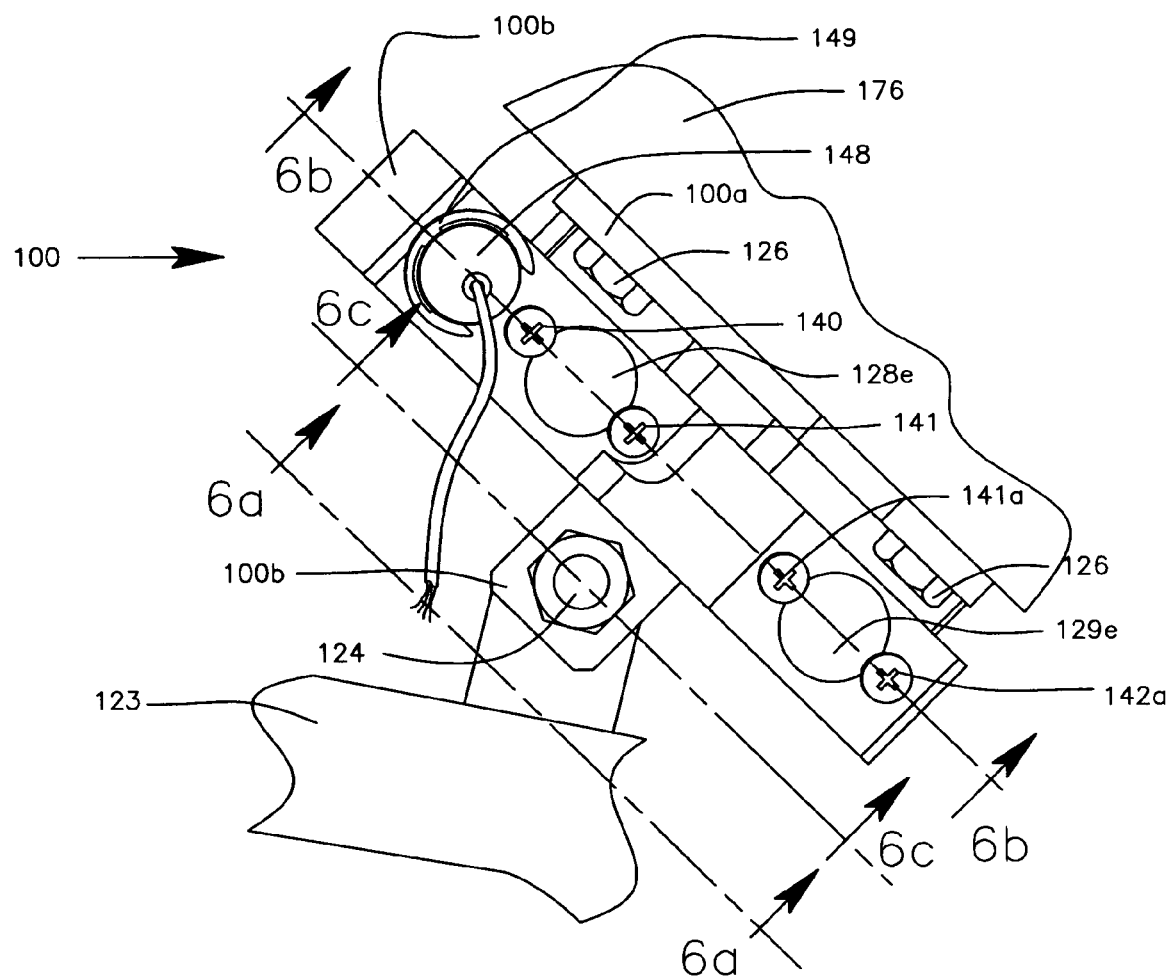
FIG. 6 is an expanded rear view of a bearing segment shown in FIG. 5(a).

Bearing segment 100 shown in FIGS. 6, 6(*a*), 6(*b*), 6(*c*), and 6(*d*), is an enlarged view of bearing segment 100 shown in FIG. 5, FIG. 5(*a*) and FIG. 5(*b*). Bearing segment 100 is capable of measuring engine torque for acceleration and torque of engine braking.

Referring to FIG. 6, bearing segment 100 has a engine component 100(*a*) attached to the engine 175 by bolts 126 and a frame component 100(*b*) attached to the frame 123 by bolt 124. As can be seen in FIGS. 6(*b*) and 6(*d*), the motor component 100(*a*) has an elongated upper track 128 formed with inner track surface 131 and outer track surface 130. Inner track surface 131 and outer track surface 130 are parallel to each other. Passing through the upper track 128 is pin 128(*a*) rotationally mounted within the frame component 100(*b*) with roller bearings 128(*b*) and 128(*c*). Similarly, the engine component 100(*a*) has an elongated lower track 129 formed with inner track surface 131(*a*) and outer track surface 130(*a*). Inner track surface 131(*a*) and outer track surface 130(*a*) are parallel to each other. Passing through the lower track 129 is pin 129(*a*) rotationally mounted within the frame component 100(*b*) with roller bearings 129(*b*) and 129(*c*).

Referring to FIGS. 6 and 6(*b*), pin 128(*a*) is retained within the frame component 100(*b*) by disk 128(*d*), disk 128(*e*), bearing 128(*f*), bearing 128(*g*), screw 140, screw 141, screw 142 and screw 143. Similarly, pin 129(*a*) is retained within the frame component 100(*b*) by disk 129(*d*), disk 129(*e*), bearing 129(*f*), bearing 129(*g*), screw 140(*a*), screw 141(*a*), screw 142(*a*) and screw 143(*a*).

Referring to FIGS. 6, 6(*a*), 6(*b*), 6(*c*), and 6(*d*), load sensor 148 is retained within bore 147 formed in the frame component 100(*b*) by snap ring 149 and snap ring 150. Pin 151 is press fitted within load sensor 148 and closely fitted within slot 152 of the frame component 100(b) to assure angular alignment of the sensor 148 with the frame component 100(b). The load sensor 148 has a reduced diameter 153 and reduced diameter 153(a) with a bump 154 and bump 154(a). The load sensor 148 is equipped with strain gages 155 connected by wire 156 for remote electrical measurement of transducer signals resulting from loads applied to either bump 154 or bump 154(a). There is a small gap 159 between engine component 100(a) and bump 154 on the load sensor 148.

Referring to FIGS. 5, 6, 6(b), and 6(d), shaft 160 is closely fitted to engine component 100(a) within bore 161 on one end and supported on the other end by ring 162 which is closely fitted in bore 163 of the engine component 100(a). The plate 164 is threadedly secured by screw 165 and screw 166 to the engine component 100(a) and retains the shaft 160 within engine component 100(a). The tire 167 riding radially on needle bearings 168 and riding axially on thrust bearing 169 and thrust bearing 170 is fixed longitudinally and free to rotate within engine segment 100(a) about shaft 160. The bore 163 and the outer diameter of the tire 167 exceed the width of the engine component 100(a) in the middle section 171 in vicinity of the tire 167. Thus, the tire 167 is exposed for rolling engagement with the frame component 100(b) on surface 172 and surface 173 and will prevent the engine component 100(a) from rubbing on frame component 100(b) when load is applied along the pivotal axis 178.

Figure 6D:
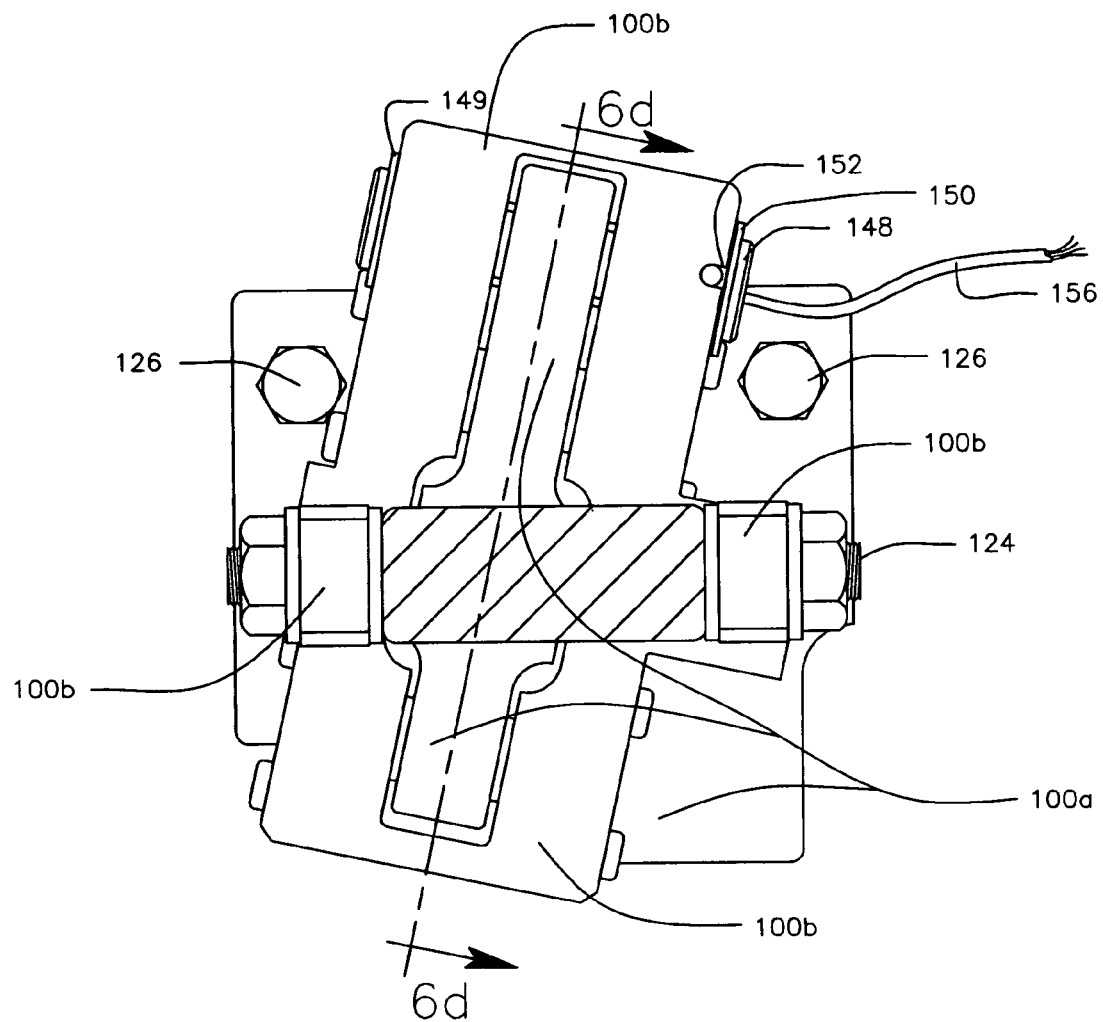
FIG. 6(d) is a cross-sectional view of the bearing segment shown in FIG. 6(a), as seen along the line 6(d)-6(d) of FIG. 6(a).
Figure 6B:
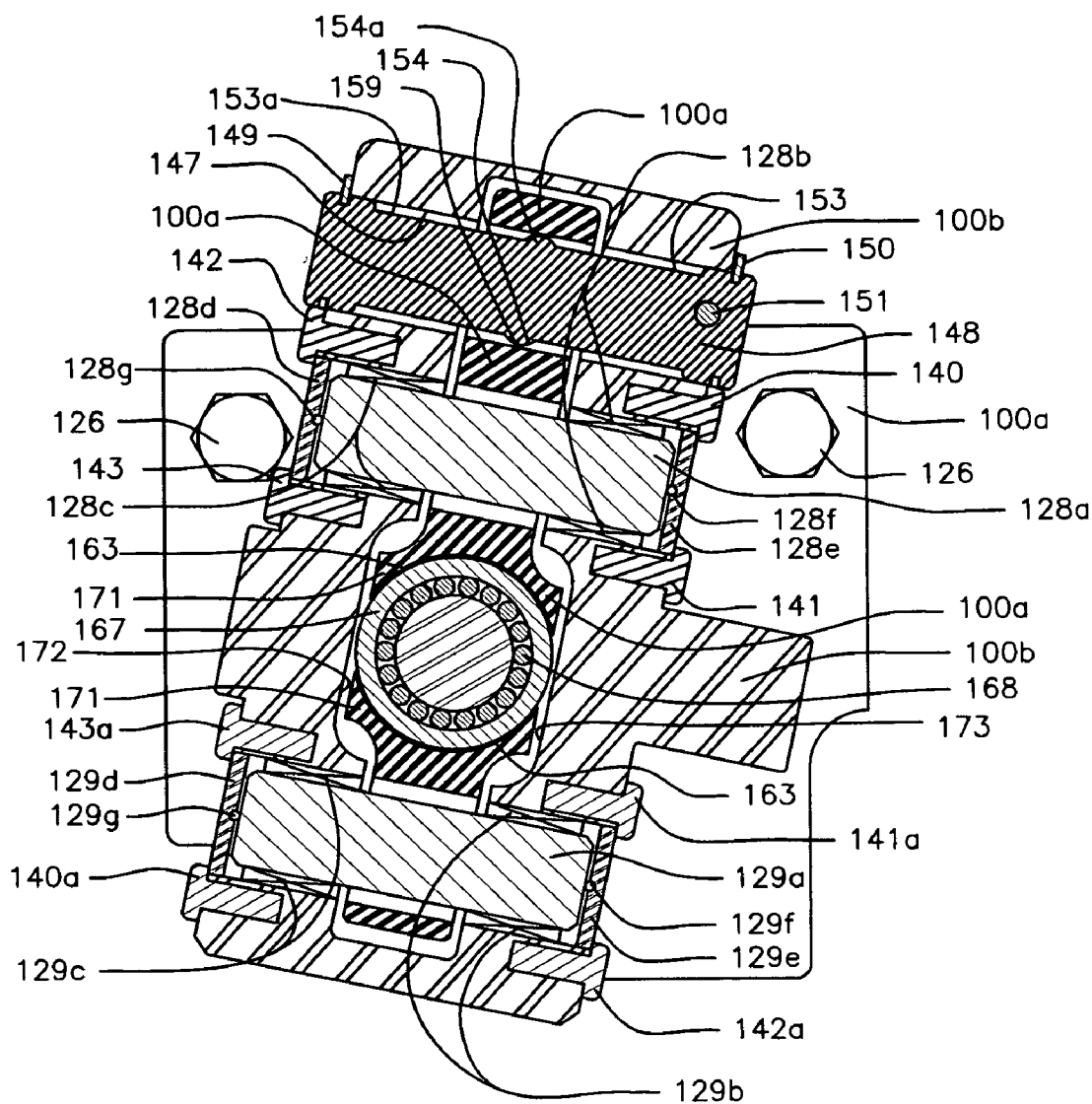
FIG. 6(b) is a cross-sectional view of the bearing segment shown in FIG. 6, as seen along the line 6(b)-6(b) of FIG. 6.
Figure 6C:
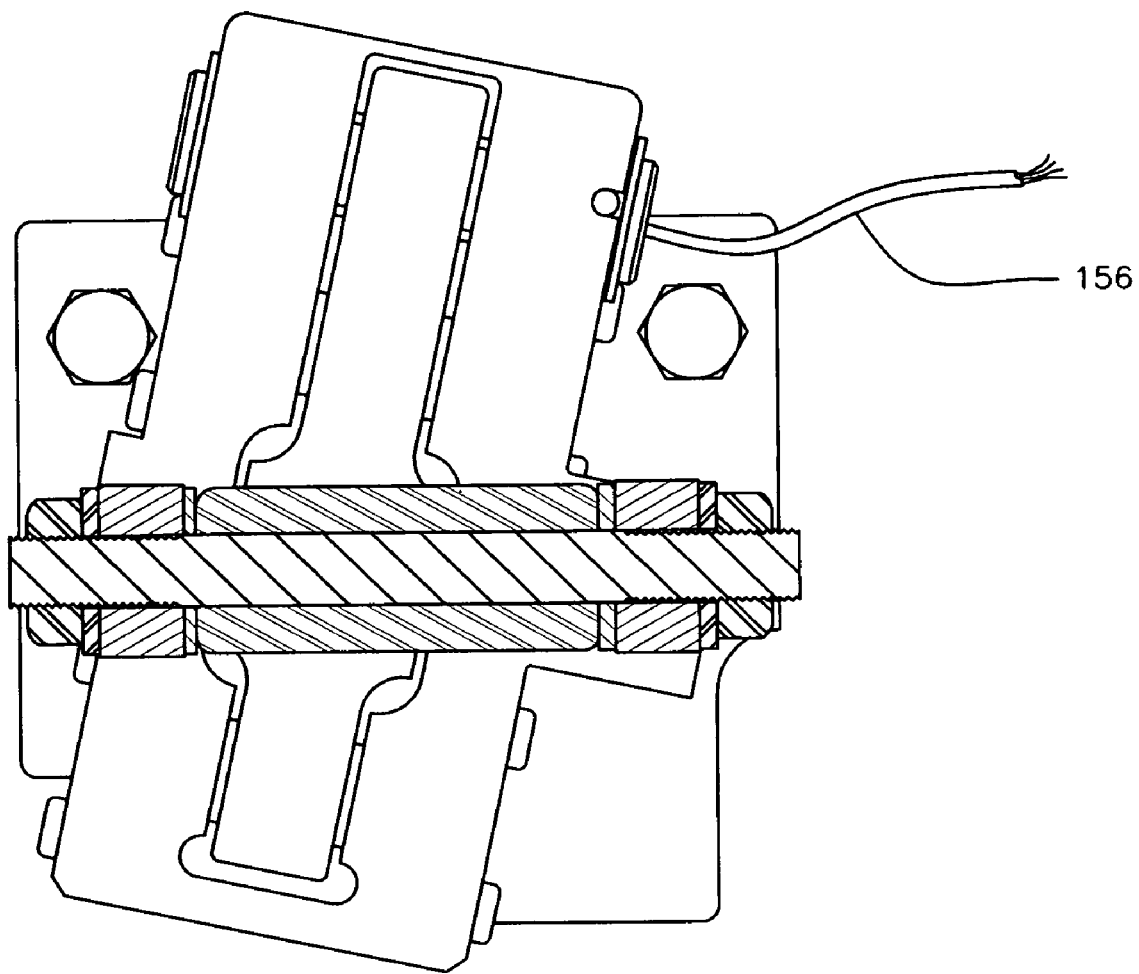
FIG. 6(c) is a cross-sectional view of the bearing segment shown in FIG. 6, as seen along the line 6(c)-6(c) of FIG. 6.
Figure 6D:
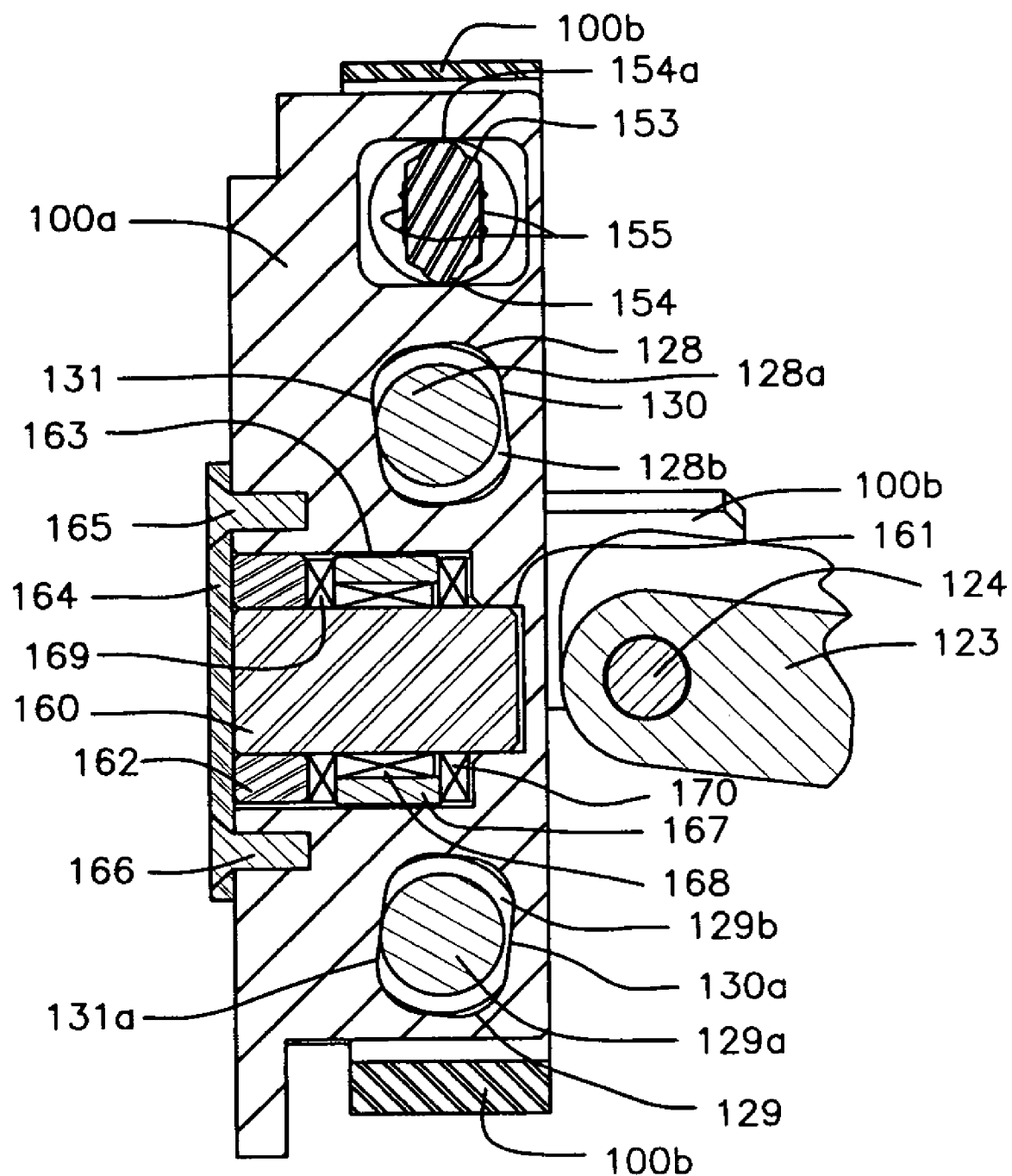

Referring to FIGS. 6(d), 6(b) and the above discussion, it can be seen that the engine component 100(a) is free to roll on pin 128(a) and pin 129(a) along the track surfaces 131 and 131(a) as described above in connection with bearing segment 21. The rolling distance is limited to the small gap 159. Arcuate motion of the engine component 100(a) is limited by the load sensor 148, mounted in the bore 147 of the frame component 100(b) which is attached to the frame 123 with bolt 124. The force of the engine component 100(a), as a result of torque reaction to engine 175 torque delivered to the output shaft 179, bearing on the bump 154 on the load sensor 148, deflects the load sensor 148 causing a detectable change in output of the load sensor 148 proportional to engine 175 torque. Arcuate motion in the opposite direction of the engine component 100(a) is also limited by the load sensor 148, mounted in the bore 147 of the frame component 100(b), which is attached to the frame 123 with bolt 124. This force of the engine component 100(a), as a result of engine 175 braking torque delivered to the output shaft 179, bearing on the bump 154(a) on the load sensor 148, deflects the load sensor 148 causing a detectable negative change in output of the load sensor 148 proportional to engine 175 torque.

Figure 5B:
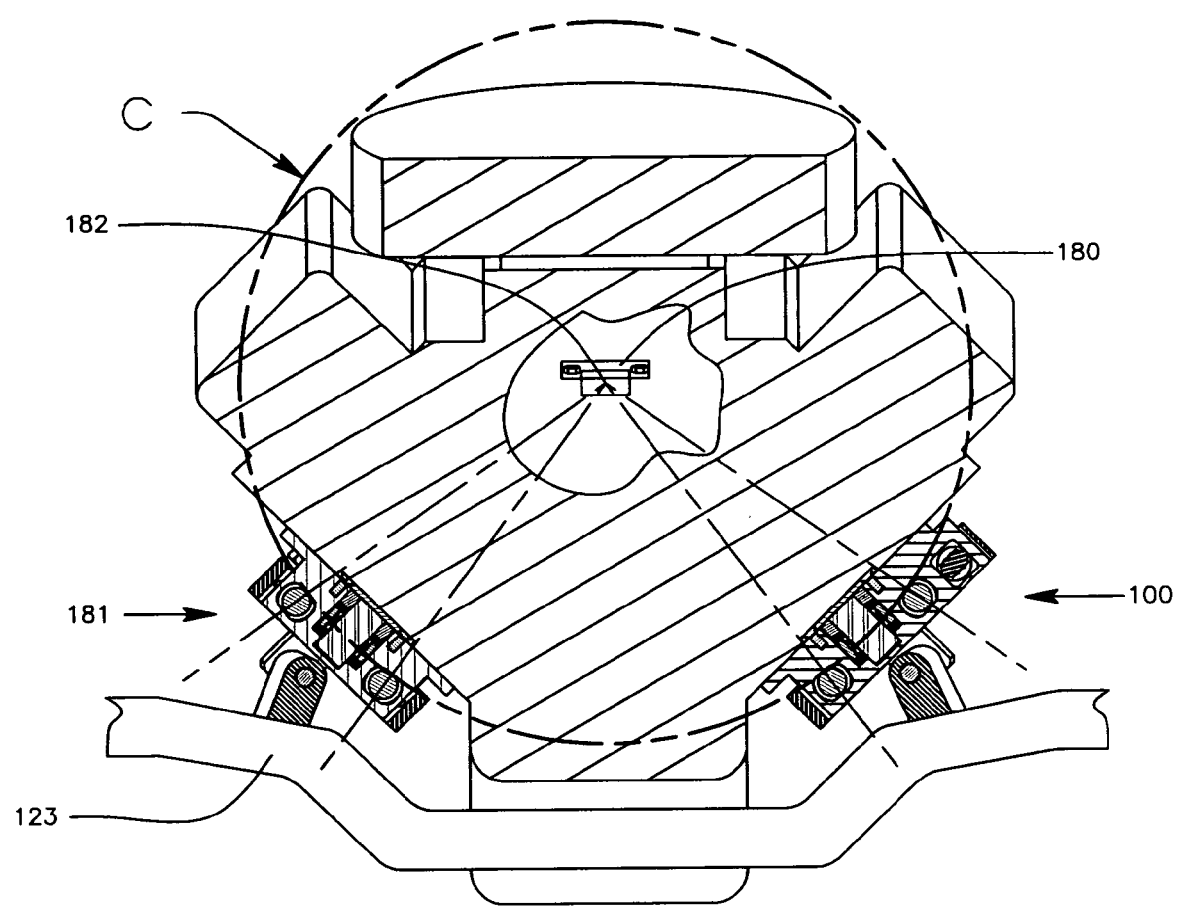
FIG. 5(b) is an enlarged cross-sectional view of the engine and frame shown in FIG. 5, as seen along the line 5(b)-5(b) of FIG. 5 and broken away to show the rear bearing.

More particularly, as shown in FIG. 5(b), bearing segments 100 and 181 are located on the circle indicated at "C" and allow the engine 175 to undergo a limited range of rotational movement about the pivotal axis 178. In this embodiment, it can be seen that the CG lies within the cone containing the center of the surfaces of relative motion of the compliant engine mount 180 and the circle "C". Again it is seen that bearing segments 100 and 181 effectively replace bearing 4 in FIG. 1.

Figure 7:
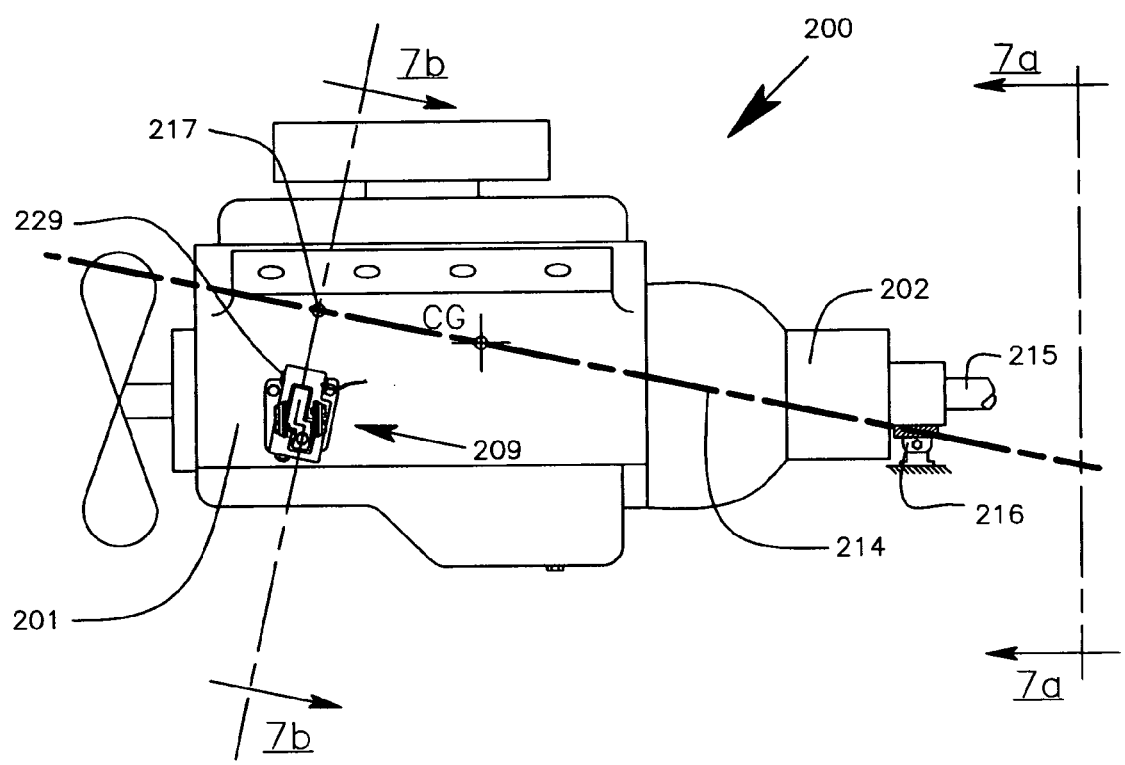
FIG. 7 is a side elevation view of an engine mounted in accordance with a further embodiment of the invention.
Figure 7A:
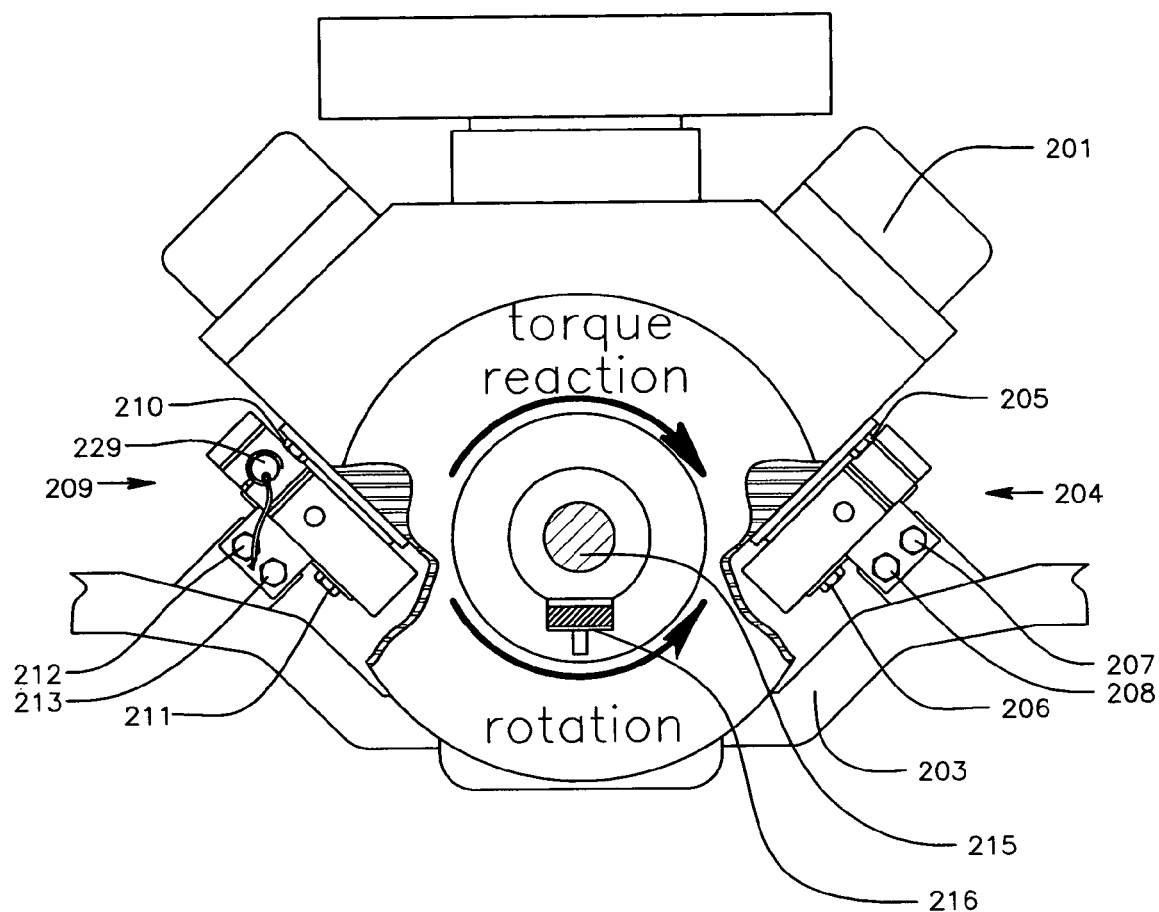
FIG. 7(a) is an enlarged rear view of the engine shown in FIG. 7, as seen along 7(a)-7(a) of FIG. 7.
Figure 7B:
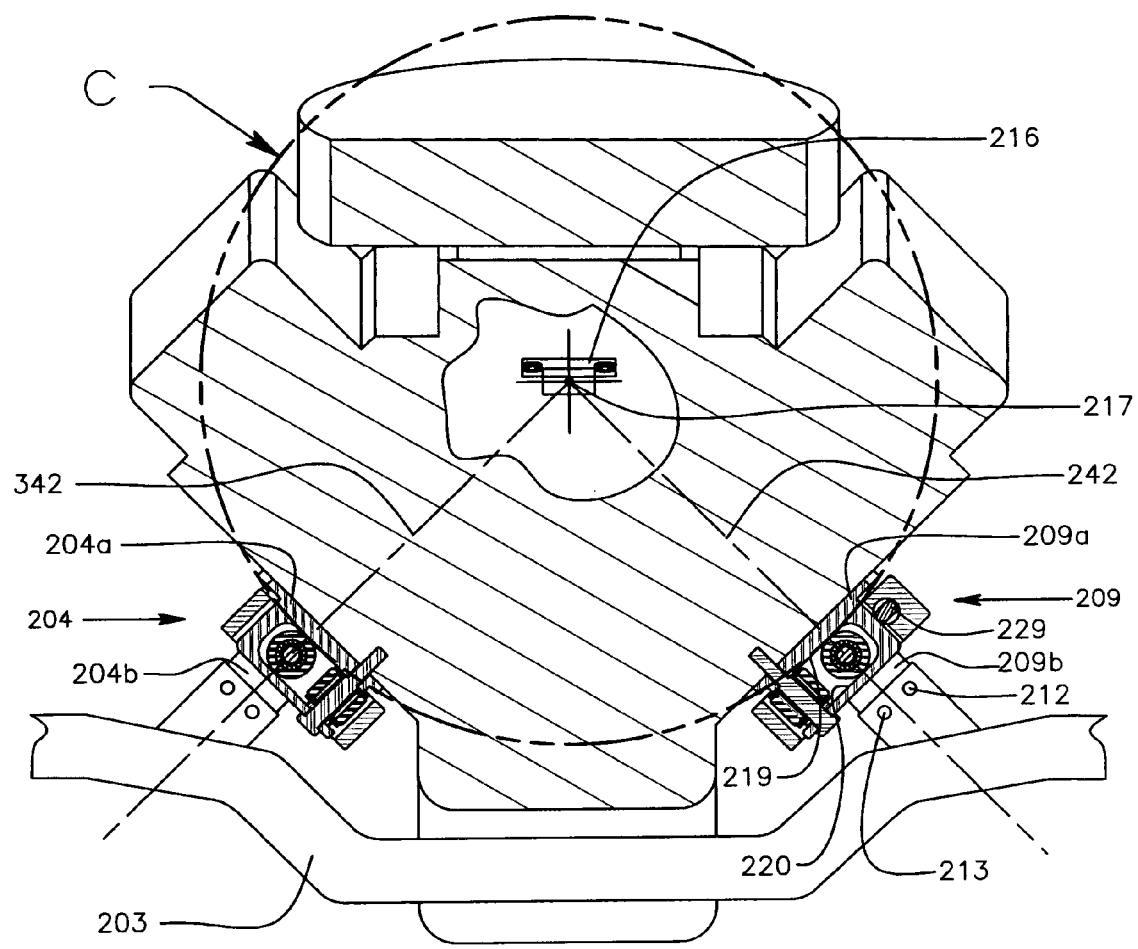
FIG. 7(b) is a cross-sectional view of the engine shown in FIG. 7, as seen along the line 7(b)-7(b) of FIG. 7, and broken away in part to show the rear bearing.
Figure 8:
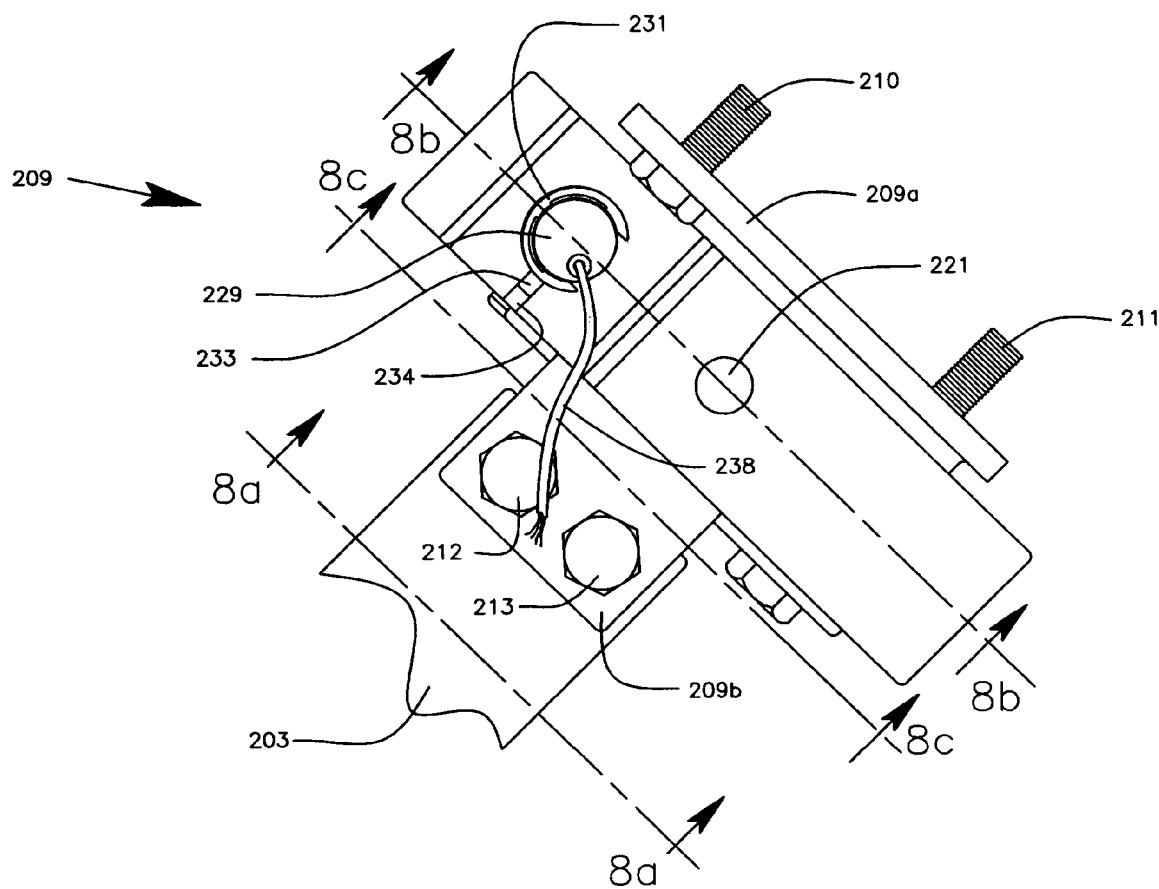
FIG. 8 is an enlarged rear view of a bearing segment shown in FIG. 7(a).
Figure 8A:
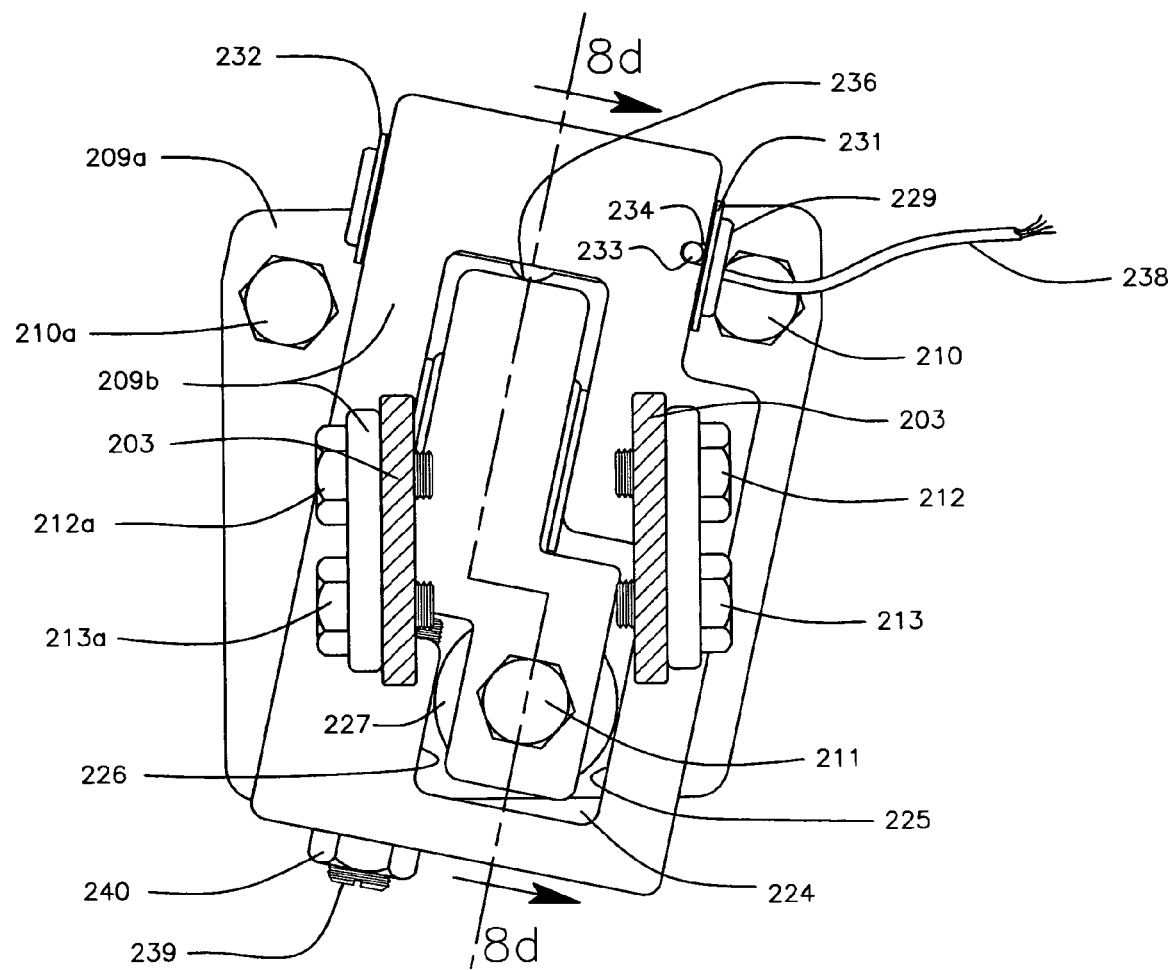
FIG. 8(a) is a cross-sectional view of the bearing segment shown in FIG. 8, as seen along the line 8(a)-8(a) of FIG. 8.
Figure 8B:
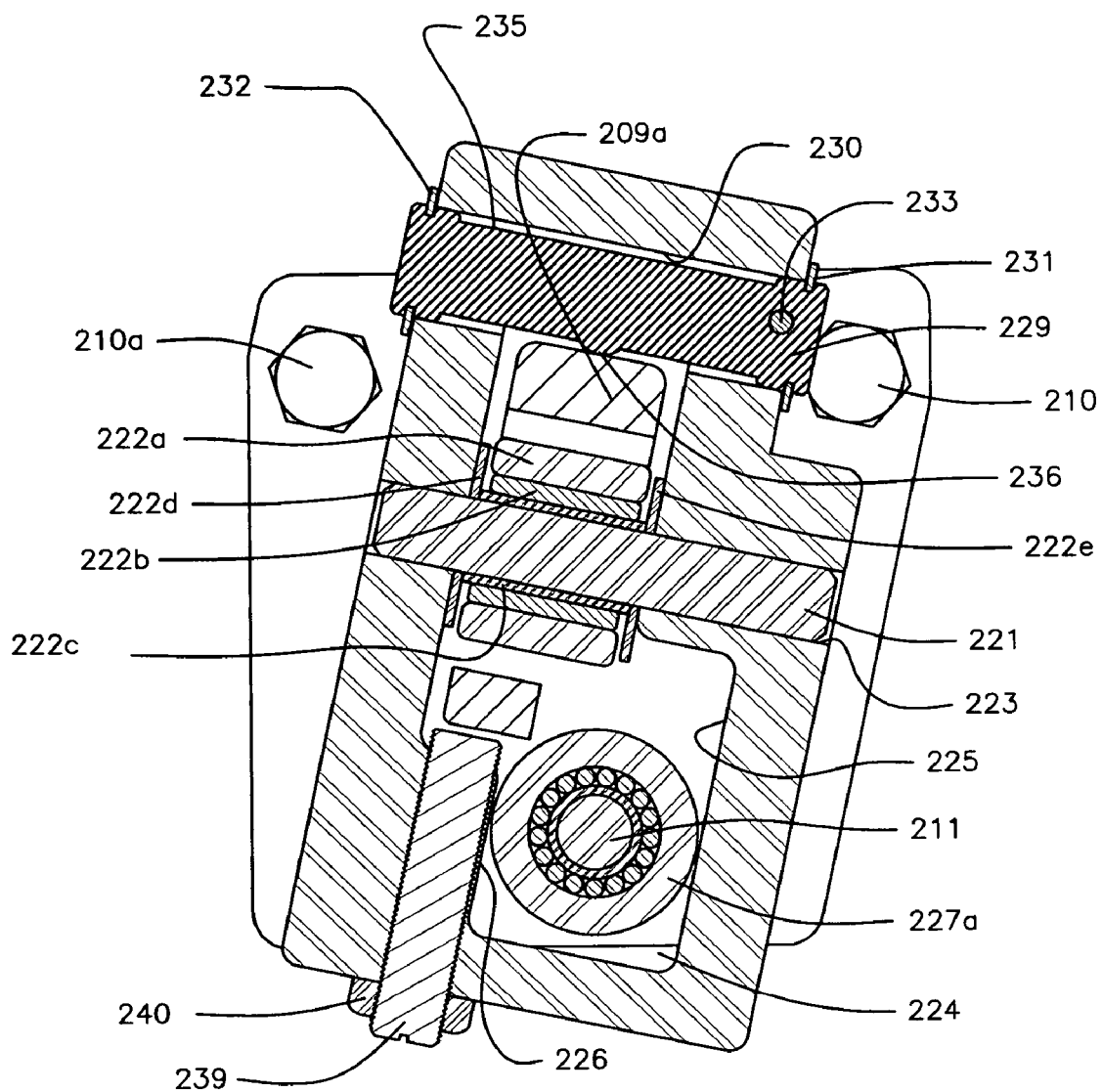
FIG. 8(b) is a cross-sectional view of the bearing segment shown in FIG. 8, as seen along the line 8(b)-8(b) of FIG. 8.
Figure 8C:
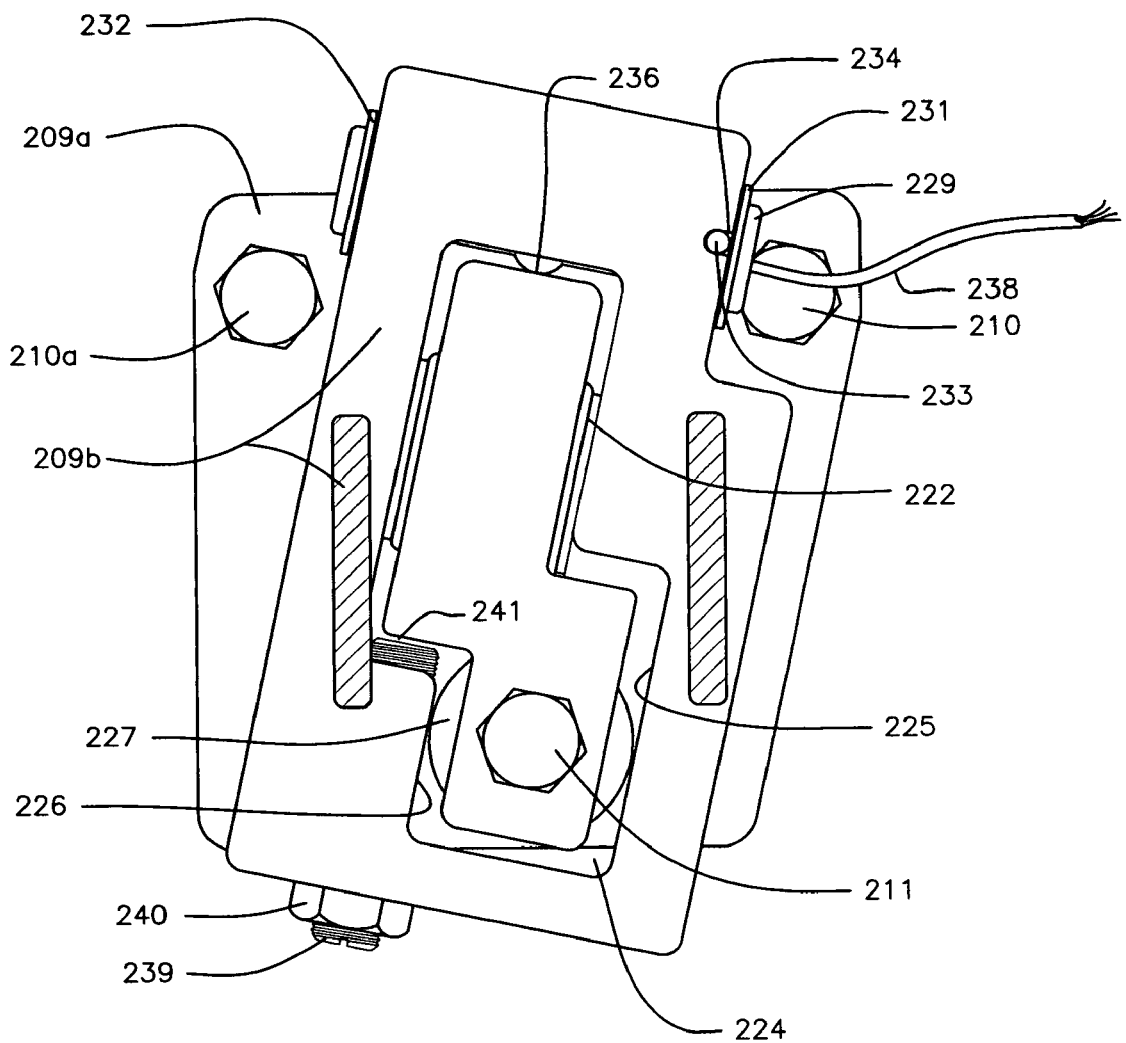
FIG. 8(c) is a cross-sectional view of the bearing segment shown in FIG. 8, as seen along the line 8(c)-8(c) of FIG. 8.
Figure 8D:
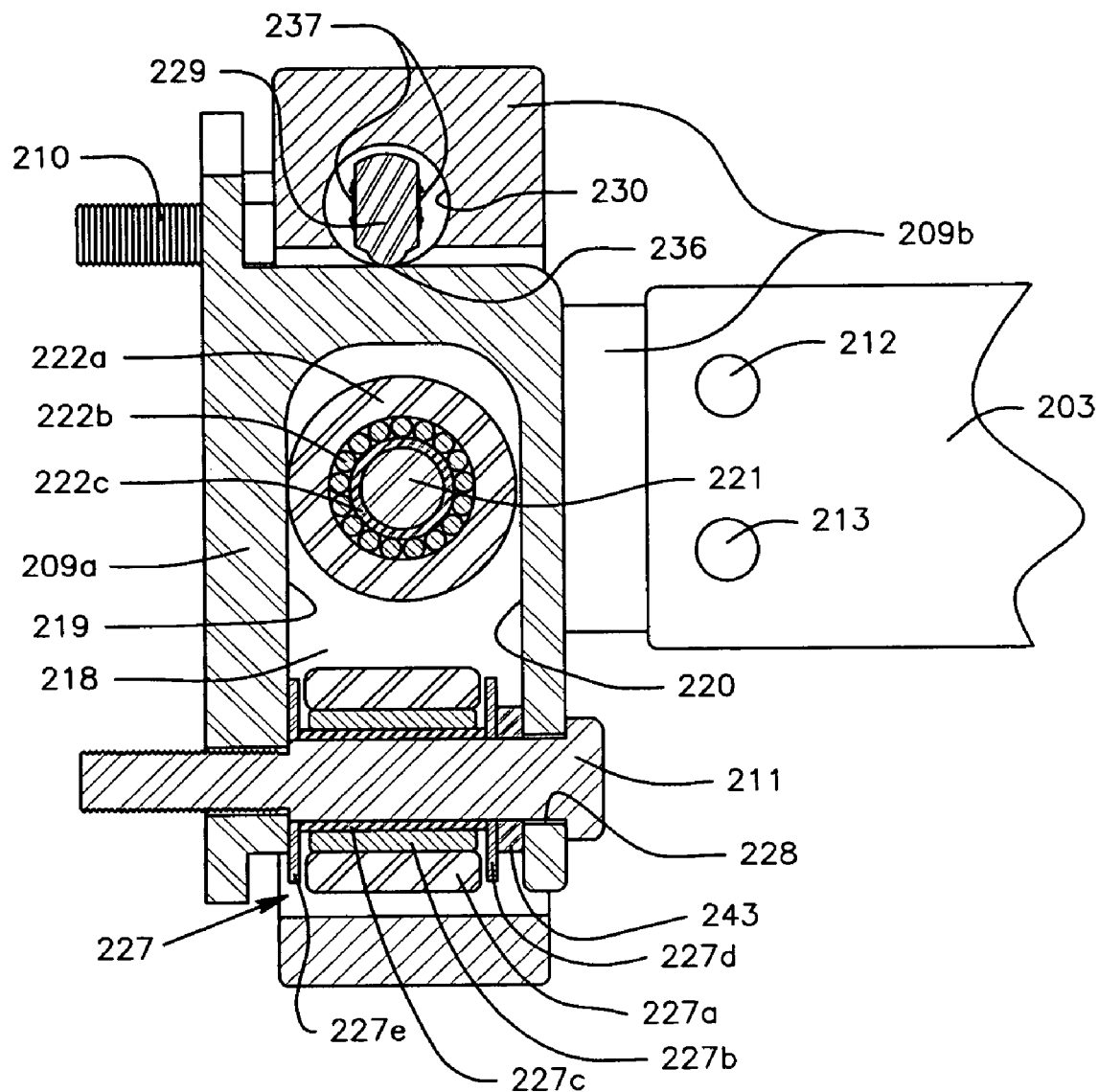
FIG. 8(d) is a cross-sectional view of the bearing segment shown in FIG. 8(a), as seen along the line 8(d)-8(d) of FIG. 8(a).
Figure 8E:
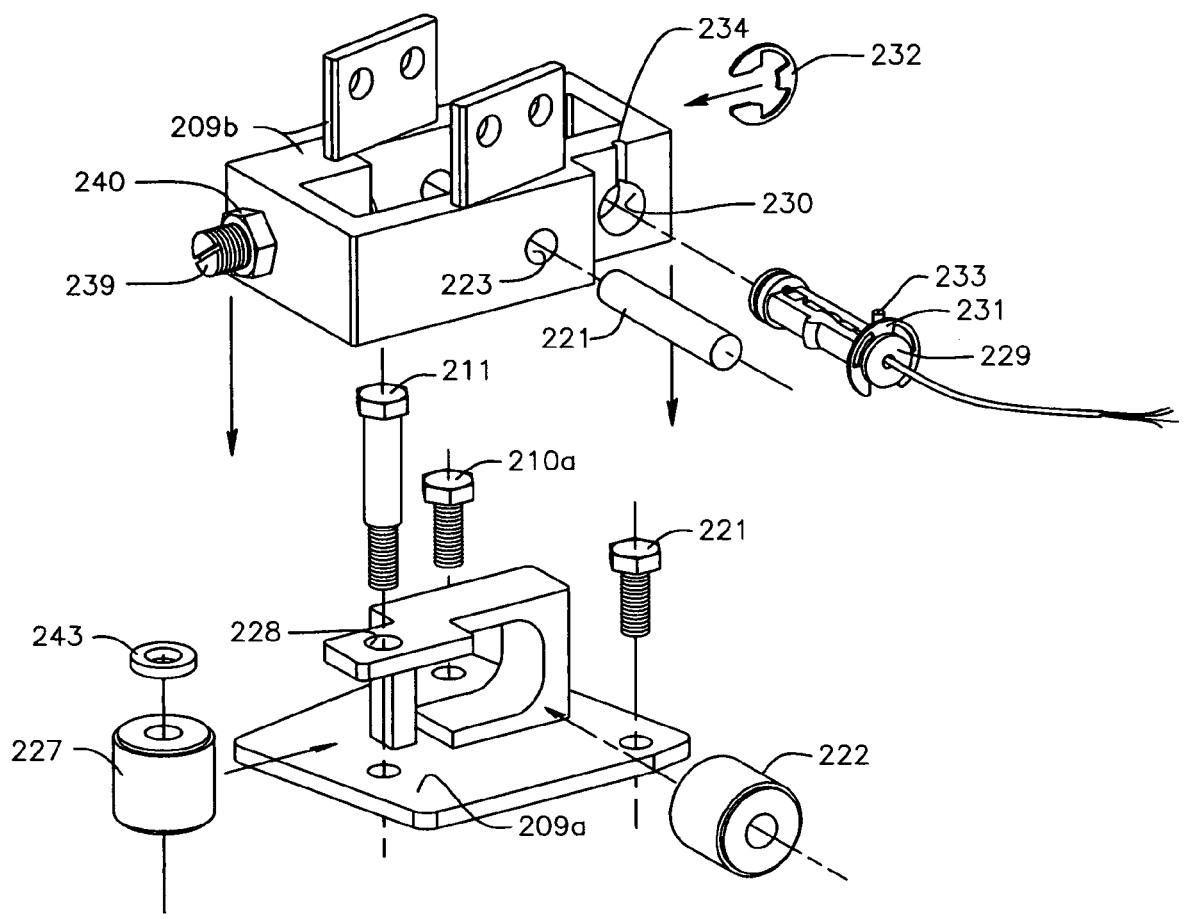
FIG. 8(e) is an exploded view showing the parts comprising the bearing segment shown in FIG. 8.

FIGS. 7, 7(a), and 7(b) disclose still another embodiment of the invention, wherein an engine 200 comprises an internal combustion motor 201 and transmission 202 assembly as might be installed in any common automobile. The engine mounting system according to this embodiment of the invention provides the same separation of engine retention forces from torque force measurement as provided by the previously described embodiments. As mentioned above, this embodiment is also compatible with the three point engine mounting systems widely used by many automobile manufacturers.

Referring to FIG. 7(a), a rear view is shown of an engine 200, attached to an automobile frame 203. Bearing segment 204 is attached to the engine 200 by bolts 205 and bolt 206, and to the frame 203 by bolt 207 and bolt 208. Bearing segment 209 is attached to the engine 200 by bolts 210 and bolt 211, and to the frame 203 by bolt 212 and bolt 213.

This embodiment of the invention is similar to the prior embodiment discussed above, except that a different and simplified construction of the bearing segments is possible due to the plurality of bolts connecting each of the two bearing segments to the automobile frame. This embodiment is an adaptation that is compatible with three point mounting systems where attachment to the frame is more secure than the single bolt disclosed by Etchells in U.S. Pat. No. 2,953,336.

FIG. 7 is a side view of an engine 200 having a pivotal axis 214 passing through or near the center of gravity CG of the engine 200. Near the transmission output shaft 215 is a compliant rubber mount 216 which acts as a bearing to position one end of the pivotal axis 214, in much the same way as bearing 5 defined one end of the pivotal axis 9 in the first embodiment discussed herein. Bearing segments 209 and 204, as will be explained below, securely attach engine 200 to the vehicle frame 203, shown in FIGS. 7(a) and 7(b), and define the location of pivotal point 217 on the pivotal axis 214, as shown in FIG. 7(b).

Referring to FIGS. 8, 8(a), 8(b), 8(c), 8(d), 8(e), 7(a), and 7(b), bearing segment 209 comprises an engine component 209(a) attached to the engine 200 by bolt 210, bolt 210(a), and bolt 211. Bearing segment 209 further comprises a frame component 209(b) attached to the automobile frame 203 by bolt 212, bolt 212(a), bolt 213, and bolt 213(a).

Referring to FIGS. 8(c), 8(b), 8(d), 8(e), and 7(b), engine component 209(a) has a track 218 formed by first track surface 219 and second track surface 220. First track surface 219 and second track surface 220 are parallel to each other. Within track 218 is a track roller assembly 222 comprising a tire 222(a), needle bearings 222(b), inner race 222(c), washer 222(d) and washer 222(e).

Referring to FIGS. 8, 8(b), 8(d), 8(e), and 7(b), the track roller assembly 222 is secured to the frame component 209(b) by pin 221 pressed into bore 223. Frame component 209(b) has a track 224 formed by first track surface 225 and second track surface 226. First track surface 225 and second track surface 226 are parallel to each other. Within track 224 is a track roller assembly 227 composed of a tire 227(a), needle bearings 227(b), inner race 227(c), washer 227(d) and washer 227(e). Track roller assemblies 222 and 227 may be commercially available units such as airframe needle roller bearing No. 8812022Y manufactured by the Torrington Company.

Referring to FIGS. 8, 8(a), 8(b), 8(d), 8(e), and 7(b), the track roller assembly 227 is secured to the engine component 209(a) by bolt 211 passing through the bore 228 in the engine component 209(a) through the washer 243 and through the track roller assembly 227 and into threaded engagement with the engine 200.

Load sensor 229 is retained within bore 230 formed in the frame component 209(b) by snap ring 231 and snap ring 232. Pin 233 is press fitted within load sensor 229 and closely fitted within slot 234 of the frame component 209(b) to assure angular alignment of the load sensor 229 with the frame component 209(b). The load sensor 229 has a reduced intermediate diameter 235 with a bump 236. The load sensor 229 is equipped with strain gages 237 connected by wire 238 for remote electrical measurement of transducer signals resulting from loads applied to the bump 236. The stop screw 239 is threadedly engaged to the frame component 209(b) and locked in place by nut 240 with a small gap 241 between the stop screw 239 and the engine component 209(a).

Thus, the tire 227(a) is exposed for rolling engagement with the frame component 209(b) on track surface 226 and track surface 225 and will prevent the engine component 209(a) from rubbing on frame component 209(b) when loads are applied along the pivotal axis 214.

The engine component 209(a) is free to roll on track roller assembly 222 along the track surface 219 or track surface 220 depending on gravity or vehicle dynamics. First projection line 242 extends from the center of pin 221 through the contact point of track roller assembly 222 on track surface 219. The significance of first projection line 242 will be explained below. The rolling distance is limited to the small gap 241.

Arcuate motion of the engine component 209(a) is limited by the load sensor 229, mounted in the bore 230 of the frame component 209(b) which is attached to the frame 203 with bolt 212, bolt 212(a), bolt 213, and bolt 213(a). The force of the engine component 209(a), as a result of torque reaction to engine 200 torque delivered to the output shaft 215, bearing on the bump 236 on the load sensor 229, deflects the load sensor 229 causing a detectable change in output of the load sensor 229 proportional to engine torque. Arcuate motion, caused by opposite engine torque from that described above, of the engine component 209(a) is limited by the stop screw 239 threadedly engaged in the frame component 209(b) which is attached to the frame 203 with bolt 212, bolt 212(a), bolt 213 and bolt 213(a). This motion will not load the load sensor 229 or create a detectable change in output.

Figure 9:
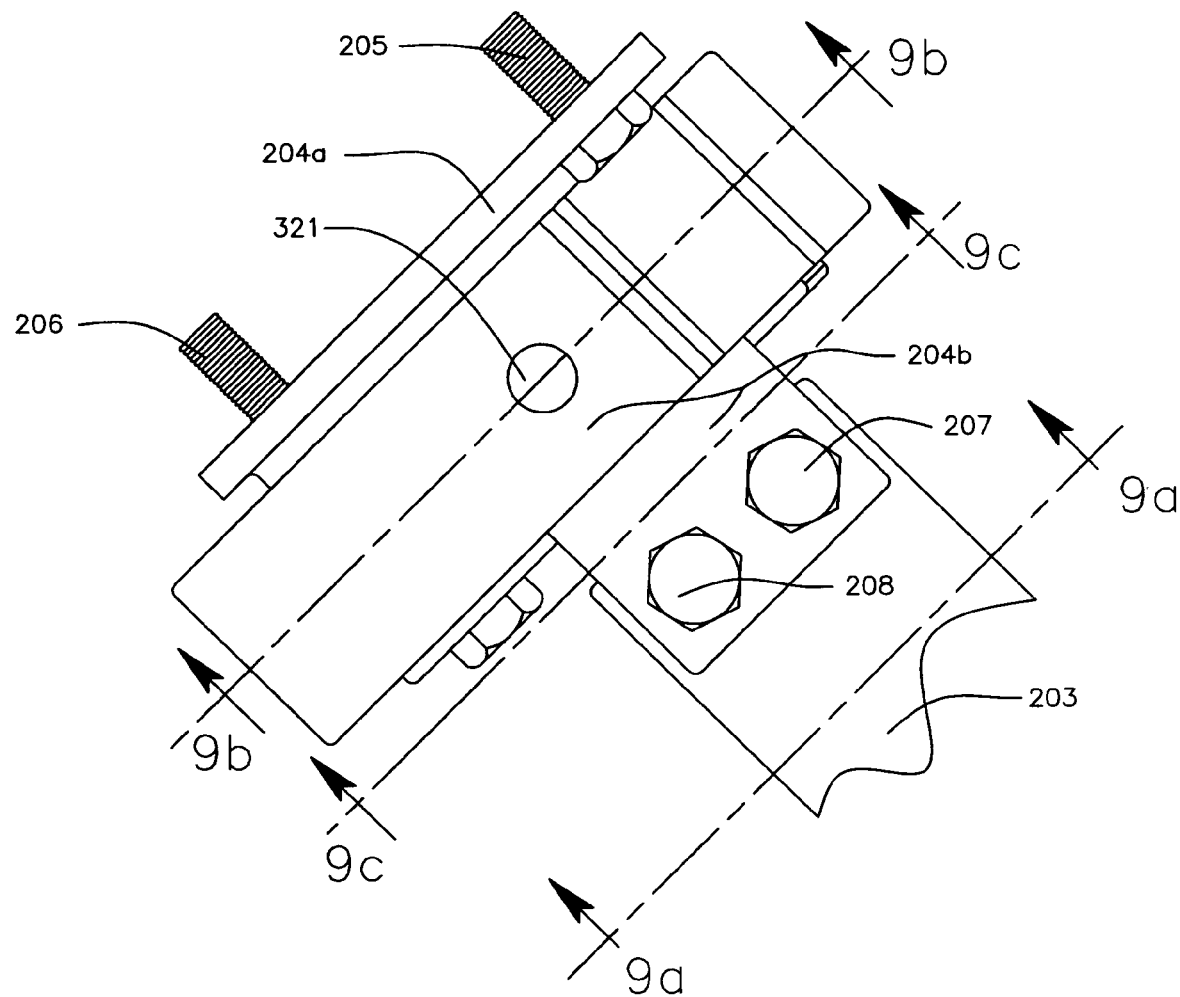
FIG. 9 is a rear view of a bearing segment shown in FIG. 7(a)
Figure 9A:
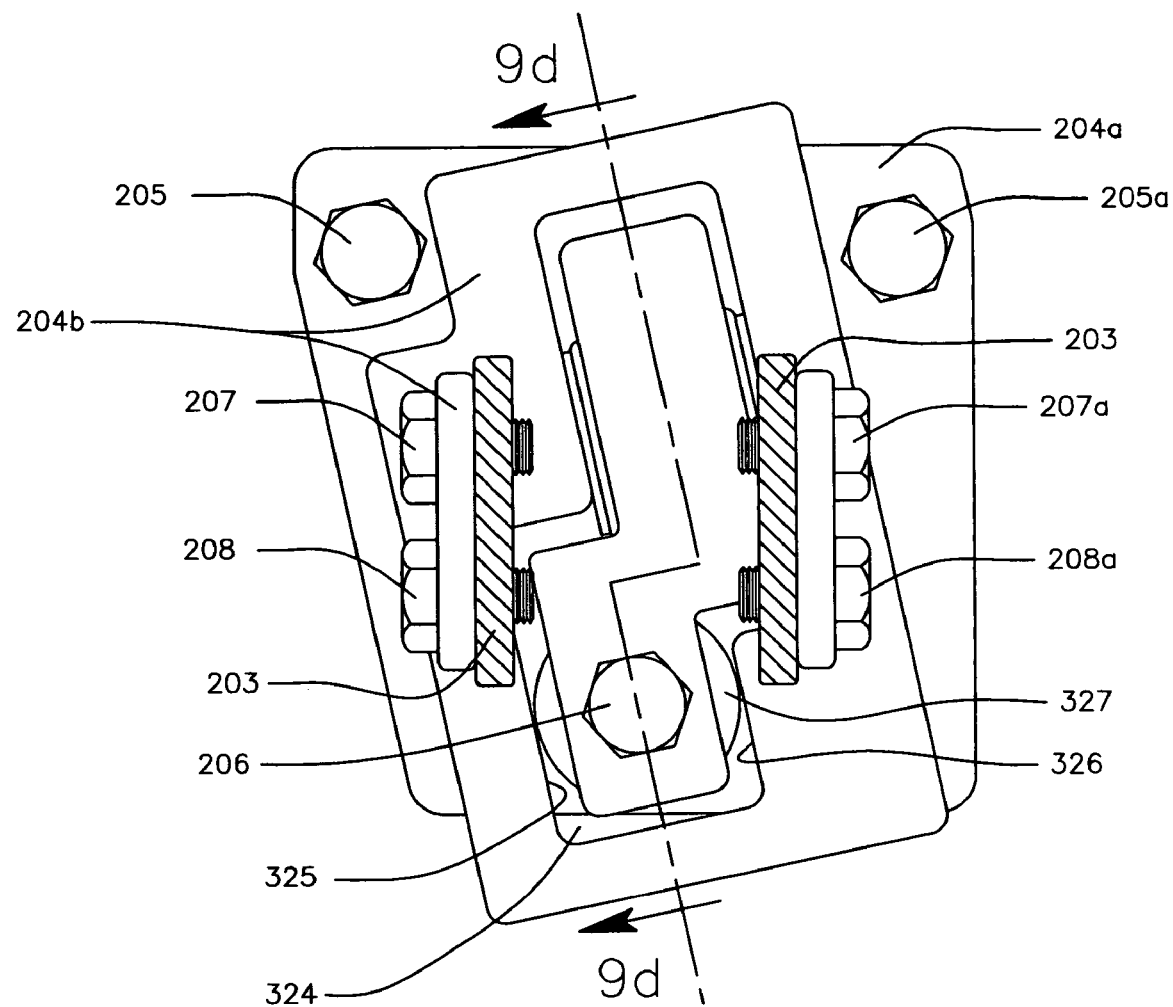
FIG. 9(a) is a cross-sectional view of the bearing segment shown in FIG. 9, as seen along the line 9(a)-9(a) of FIG. 9.
Figure 9B:
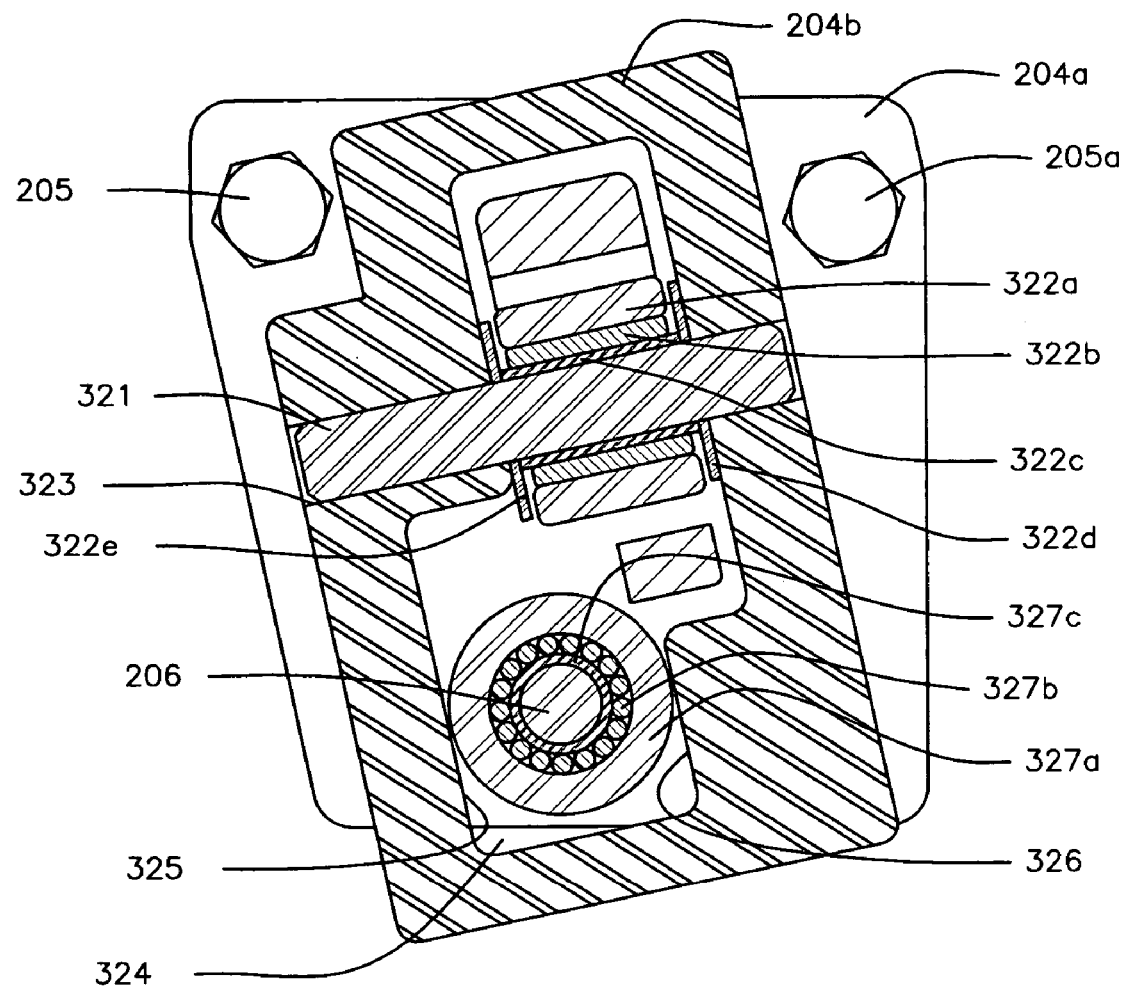
FIG. 9(b) is a cross-sectional view of the bearing segment shown in FIG. 9, as seen along the line 9(b)-9(b) of FIG. 9.
Figure 9C:
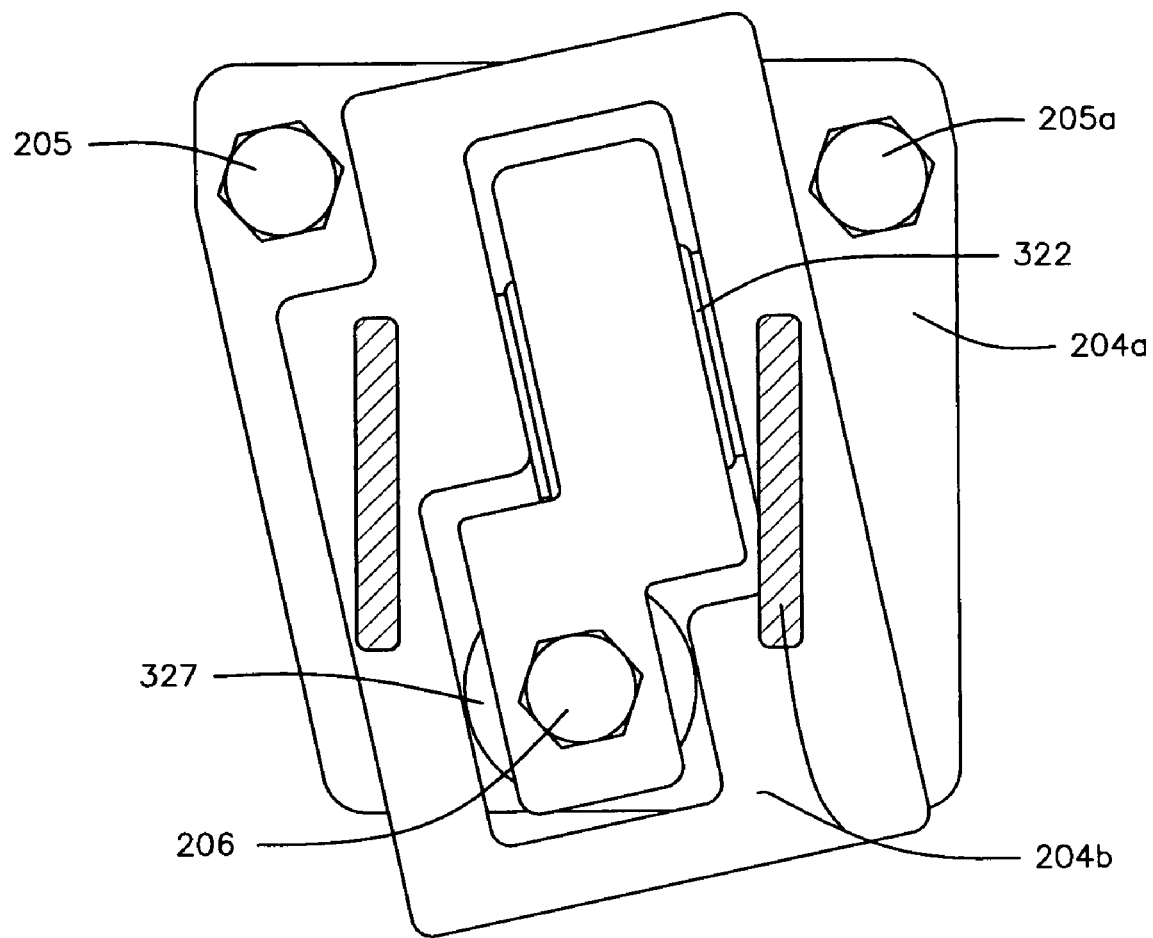
FIG. 9(c) is a cross-sectional view of the bearing segment shown in FIG. 9, as seen along the line 9(c)-9(c) of FIG. 9.
Figure 9D:
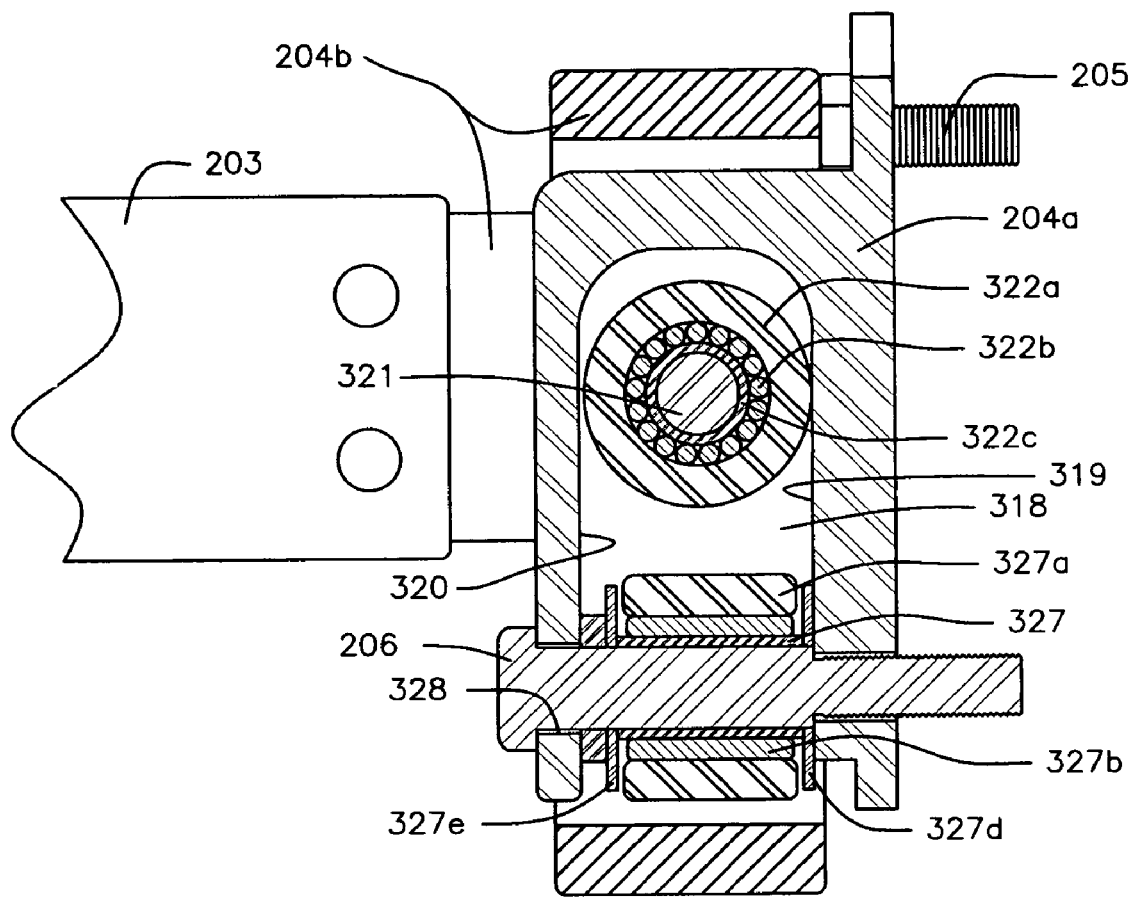
FIG. 9(d) is a cross-sectional view of the bearing segment shown in FIG. 9(a), as seen along the line 9(d)-9(d) of FIG. 9(a).

FIG. 9 is an enlarged view of bearing segment 204 shown in FIG. 7(a) with section lines to define the cross-sectional views of FIGS. 9(a), 9(b), and 9(c). FIG. 9(d) is a cross-sectional view of bearing segment 204 taken along the section lines defined in FIG. 9(a).

Referring to FIGS. 9, 9(a), 9(b), 9(c), 9(d), 7(a), and 7(b), bearing segment 204 comprises an engine component 204(a) attached to the engine 200 by bolt 205, bolt 205(a), and bolt 206. Bearing segment 204 further comprises a frame component 204(b) attached to the frame 203 by bolt 207, bolt 207(a), bolt 208, and bolt 208(a). The engine component 204(a) has a track 318 formed by first track surface 319 and second track surface 320. First track surface 319 and second track surface 320 are parallel to each other. Within track 318 is a track roller assembly 322 composed of a tire 322(a), needle bearings 322(b), inner race 322(c), washer 322(d) and washer 322(e). The track roller assembly 322 is secured to the frame component 204(b) by pin 321 pressed into bore 323.

The frame component 204(b) comprises a track 324 formed by first track surface 325 and second track surface 326. First track surface 325 and second track surface 326 are parallel to each other. Within track 324 is a track roller assembly 327 composed of a tire 327(a), needle bearings 327(b), inner race 327(c), washer 327(d) and washer 327(e). Track roller assemblies 322 and 327 may be commercially available units such as airframe needle roller bearing No. 8NBL2022YJ manufactured by the Torrington Company, aforementioned.

Referring to FIGS. 9, 9(a), 9(b), 9(d), and 7(b), the track roller assembly 327 is secured to the engine component 204(a) by bolt 206 passing through the bore 328 in the engine component 204(a) and through the track roller assembly 327 and into threaded engagement with the engine 200.

Referring to FIGS. 7, 7(a), 7(b), 9, 9(a), 9(b), 9(d), tire 327 is exposed for rolling engagement with the frame component 204(b) on first track surface 326 and second track surface 325 and will prevent the engine component 204(a) from rubbing on frame component 204(b) when loads are applied along the pivotal axis 214.

Engine component 204(a) is free to roll on track roller assembly 322 along the first track surface 319 or second track surface 320 depending on gravity or vehicle dynamics. The rolling distance is limited in one direction to the small gap 241 previously described in connection with first bearing segment 209. Motion of the engine component 204(a) is limited in the other direction by the load sensor 229 previously described in connection with bearing segment 209.

Second projection line 342 extends from the center of pin 321 through the contact point of track roller assembly 322 on track surface 319. The intersection of second projection line 342 with the previously described first projection line 242 locates a pivotal point 217 that along with the compliant rubber mount 216 defines the pivotal axis 214.

More particularly, as shown in FIG. 7(b), bearing segments 209 and 204 are located on the circle indicated at "C" and allow the engine 200 to undergo a limited range of rotational movement about pivotal axis 214. In this embodiment, it can be seen that the CG lies within the cone containing the center of the surfaces of relative motion of the compliant engine mount 216 and the circle "C". Again it is seen that the bearing segments 209 and 204 effectively replace bearing 4 of the first embodiment shown in FIG. 1.

Various basics of the invention have been explained herein. Details for the implementation thereof can be added by those with ordinary skill in the art. Various combinations and permutations of all elements or applications can be created and presented. All can be done to optimize performance in a specific application. Those skilled in the art will readily appreciate such variations hereof without departing from the spirit and scope of the present invention.

What is claimed is:

1. A system for mounting an engine having an output shaft to a frame, comprising:
   first and second bearings each connectable to the frame and the engine to form a pivotal axis about which said engine is free to rotate relative to said frame,
   said pivotal axis passing near the center of gravity of the engine and aligned other than orthogonally to the axis of the engine output shaft, and
   a load sensing transducer including parts connectable to said frame and said engine for resisting and measuring rotational forces between said engine and said frame about said pivotal axis,
   said load sensing transducer having an axis of sensitivity on a plane other than any plane which includes the pivotal axis.

2. The system of claim 1, wherein:
   said load sensing transducer measures rotational forces in only one direction.

3. The system of claim 1, wherein:
   the first and second bearings are connectable to forward and rearward portions of the frame and engine and are in axial alignment to receive shaft portions on the pivotal axis at opposite ends of the engine.

4. The system of claim 1, wherein:
one of the bearings comprises bearing segments, each connectable to the engine and frame.

5. The system claim 4, wherein:
the bearing segments each having a first part guidably moveable with respect to a second part form a pivotal point on the pivotal axis.

6. The system claim 5, wherein:
one of said parts contains a rolling element guidably moveable in a slot in the other part.

7. The system of claim 4, wherein:
the other of said bearings comprises a compliant engine mount.

8. The system as in any one of claims 1 to 7, wherein:
the pivotal axis extends through the center of gravity.

9. A system for mounting an engine having an output shaft to a frame, comprising:
first and second bearings each connectable to the frame and engine to form a pivotal axis about which said engine is free to rotate relative to said frame,
said pivotal axis aligned other than orthogonally to the axis of the engine output shaft, and so positioned that a conical volume formed by the center of one bearing and the circle defined by the surfaces of relative motion of the other bearing contains the center of gravity of the engine, and
a load sensing transducer including parts connectable to said frame and said engine for resisting and measuring rotational forces between said engine and said frame about said pivotal axis,
said load sensing transducer having an axis of sensitivity on a plane other than any plane which includes the pivotal axis.

10. The system of claim 9, wherein:
said load sensing transducer measures rotational forces in only one direction.

11. The system of claim 9, wherein:
the first and second bearings are connectable to forward and rearward portions of the frame and engine and in axial alignment to receive shaft portions on the pivotal axis at opposite ends of the engine.

12. The system of claim 9, wherein:
one of the bearings comprises bearing segments, each connectable to the engine and frame.

13. The system claim 12, wherein:
the bearing segments each having a first part guidably moveable with respect to a second part form a pivotal point on the pivotal axis.

14. the system claim 13, wherein:
one of said parts contains a rolling element guidably moveable in a slot in the other part.

15. The system of claim 12, wherein:
the other of said bearings comprises a compliant engine mount.

16. The system as in any one of claims 9 to 15, wherein:
the pivotal axis extends through the center of gravity.

17. A system for mounting an engine having an output shaft to a frame, comprising:
first and second bearings each connectable to the frame and engine to form a pivotal axis about which said engine is free to rotate relative to said frame,
said pivotal axis aligned other than orthogonally to the axis of the engine output shaft, and
at least one of said bearings having rolling elements between the engine and frame, and
a load sensing transducer including parts connectable to said frame and said engine for resisting and measuring rotational forces between said engine and said frame about said pivotal axis,
said load sensing transducer having an axis of sensitivity on a plane other than any plane which includes the pivotal axis.

18. The system of claim 17, wherein:
said load sensing transducer measures rotational forces in only one direction.

19. The system of claim 17, wherein:
the first and second bearings are connectable to forward and rearward portions of the frame and engine and are in axial alignment to receive shaft portions on the pivotal axis at opposite ends of the engine.

20. The system of claim 17, wherein:
one of the bearings comprises bearing segments, each connectable to the engine and frame.

21. The system claim 20, wherein:
the bearing segments each having a first part guidably moveable with respect to a second part form a pivotal point on the pivotal axis.

22. The system claim 21, wherein:
one of said parts contains a rolling element guidably moveable in a slot in the other part.

23. The system of claim 20, wherein:
the other of said bearings comprises a compliant engine mount.

24. The system as in any one of claims 17 to 23, wherein:
the pivotal axis extends through the center of gravity.

25. A system for mounting an engine having an output shaft to a frame, comprising:
first and second bearings each connectable to the frame and the engine to form a pivotal axis about which said engine is free to rotate relative to said frame,
said pivotal axis aligned other than orthogonally to the axis of the engine output shaft, and
one of said bearing having a pivotal point outside of the space between the surfaces of relative motion of said one bearing,
a load sensing transducer including parts connectable to said frame and said engine for resisting and measuring rotational forces between said engine and said frame about said pivotal axis,
said load sensing transducer having an axis of sensitivity on a plane other than any plane which includes the pivotal axis.

26. The system of claim 25, wherein:
said load sensing transducer measures rotational forces in only one direction.

27. The system of claim 25, wherein:
the first and second bearings are connectable to forward and rearward portions of the frame and engine and are in axial alignment to receive shaft portions on the pivotal axis at opposite ends of the engine.

28. The system of claim 25, wherein:
one of the bearings comprises bearing segments, each connectable to the engine and frame.

29. The system claim 28, wherein:
the bearing segments each having a first part guidably moveable with respect to a second part form a pivotal point on the pivotal axis.

30. The system claim 29, wherein:
one of said parts contains a rolling element guidably moveable in a slot in the other part.

31. The system of claim 28, wherein:

the other of said bearings comprises a compliant engine mount.

32. The system as in any one of claims 25 to 31, wherein:

the pivotal axis extends through the center of gravity.

* * * * *